US012316262B2

(12) United States Patent
Suzuki et al.

(10) Patent No.: US 12,316,262 B2
(45) Date of Patent: May 27, 2025

(54) TECHNIQUE FOR PROTECTING MOTOR IN ELECTRIC WORK MACHINE FROM OVER TEMPERATURE

(71) Applicant: MAKITA CORPORATION, Anjo (JP)

(72) Inventors: Dai Suzuki, Anjo (JP); Masayuki Okamura, Anjo (JP); Itsuku Kato, Anjo (JP)

(73) Assignee: MAKITA CORPORATION, Anjo (JP)

( * ) Notice: Subject to any disclaimer, the term of this patent is extended or adjusted under 35 U.S.C. 154(b) by 153 days.

(21) Appl. No.: 18/134,309

(22) Filed: Apr. 13, 2023

(65) Prior Publication Data
US 2023/0336105 A1    Oct. 19, 2023

(30) Foreign Application Priority Data

Apr. 15, 2022 (JP) .................. 2022-067526

(51) Int. Cl.
*H02P 29/032* (2016.01)
*B25F 5/00* (2006.01)
*H02P 6/24* (2006.01)

(52) U.S. Cl.
CPC .............. *H02P 29/032* (2016.02); *B25F 5/00* (2013.01); *H02P 6/24* (2013.01)

(58) Field of Classification Search
CPC .......... H02P 29/032; H02P 6/24; H02P 29/60; H02P 27/08; B25F 5/00; H02H 7/085; H02H 1/0007; H02H 7/0852; A01G 3/085; A01G 3/086

USPC ................... 318/434, 400.08, 400.04, 400.01
See application file for complete search history.

(56) References Cited

U.S. PATENT DOCUMENTS 5,729,104 A * 3/1998 Kamishima .......... H02H 7/0851
318/473
6,719,396 B2 * 4/2004 Anzai ..................... H02P 29/02
400/582
10,461,674 B2 * 10/2019 Yabuguchi ................ H02P 6/24

FOREIGN PATENT DOCUMENTS

JP        6789834 B2    11/2020

* cited by examiner

*Primary Examiner* — David Luo
(74) *Attorney, Agent, or Firm* — Oliff PLC

(57) ABSTRACT

An electric working machine in one aspect of the present disclosure calculates an estimated heat value based on an electric current value and a parameter. The estimated heat value corresponds to an estimated heat generation amount of a motor. The electric current value corresponds to a magnitude of an electric current delivered from a power source to the motor. The electric work machine varies the parameter based on a load time. The load time corresponds to a time period during which a first load is continuously imposed on the motor. The first load has a specified magnitude or more. The electric work machine performs a protective operation for over temperature protection of the motor based on the estimated heat value having reached a heat threshold.

20 Claims, 16 Drawing Sheets

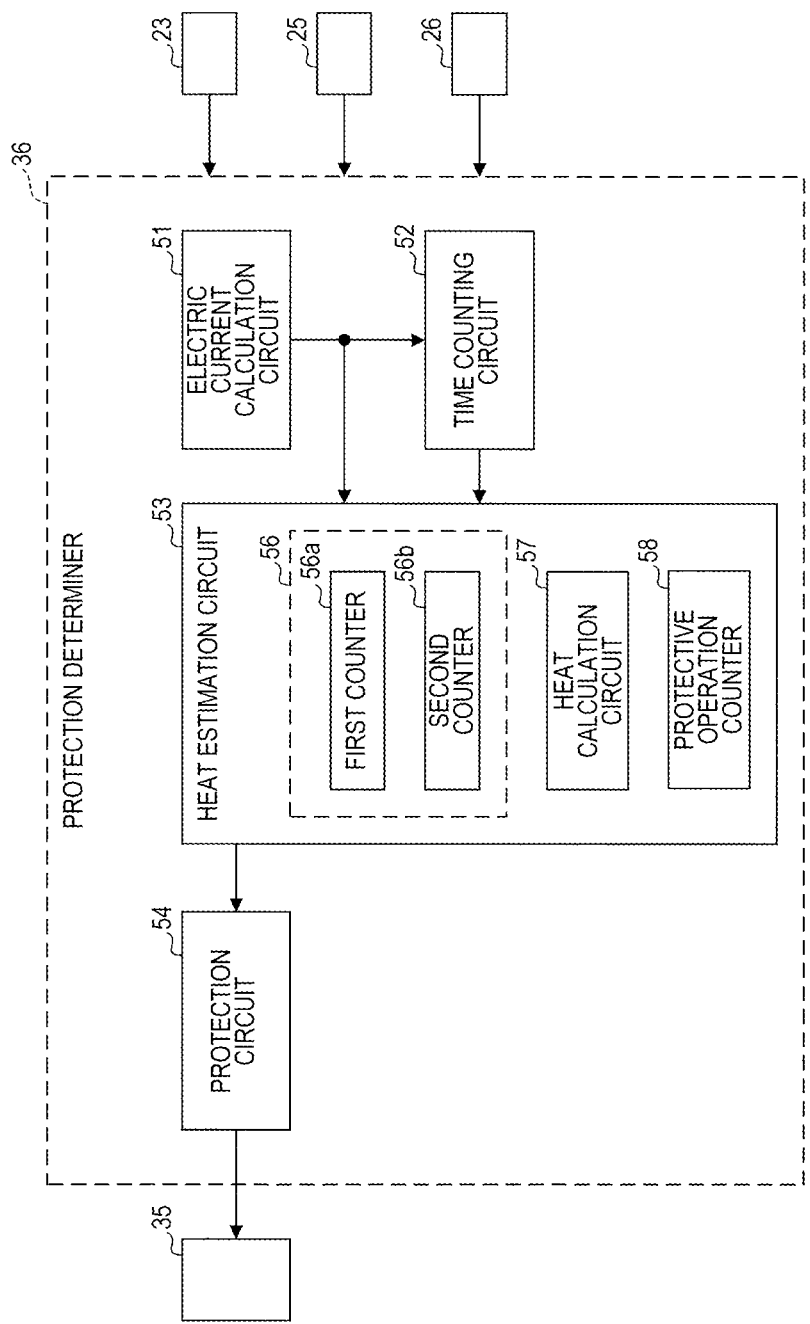

TECHNIQUE FOR PROTECTING MOTOR IN ELECTRIC WORK MACHINE FROM OVER TEMPERATURE

CROSS-REFERENCE TO RELATED APPLICATIONS

This application claims the benefit of Japanese Patent Application No. 2022-067526 filed on Apr. 15, 2022 with the Japanese Patent Office, the entire disclosure of which is incorporated herein by reference.

BACKGROUND

The present disclosure relates to a technique to control a motor of an electric work machine.

Japanese Patent No. 6789834 discloses an electric work machine configured to estimate a heat generation amount of a motor. The electric work machine detects a load on the motor and estimates the heat generation amount based on thus detected load. More specifically, the electric work machine includes a counter. The counter sequentially counts up a counter value when the motor is in a first loaded state. More specifically, the counter increases the counter value by an increment value. The first loaded state corresponds to a state where a load greater than or equal to a set value is imposed on the motor. The counter value on the counter corresponds to an estimated value of the heat generation amount. If the counter value exceeds a threshold, then the motor is protected (for example, stopped).

SUMMARY

The motor generates heat while the motor is in the first loaded state and is cooled when the state of the motor changes to a second loaded state. The second loaded state corresponds to, for example, a state where the magnitude of the load is less than the set value or equal to zero. As the ratio of the time taken in the first loaded state to the time taken in the second loaded state (that is, a value obtained by dividing the time taken in the first loaded state by the time taken in the second loaded state) is small, an increase in the temperature of the motor is inhibited. Or, as a load time is short, an increase in the temperature of the motor is inhibited. The load time corresponds to a time period during which the first loaded state continues. In other words, as the aforementioned ratio is small, or as the load time is short, the motor is readily cooled while in the second loaded state.

Accordingly, if the increment value of the counter is set to a large value assuming that, for example, the aforementioned ratio is large or the load time is long, there is a possible risk that the motor is excessively protected. For example, the electric work machine may be used in a manner that keeps the aforementioned ratio small, or in a manner that keeps the load time short. In this case, despite an extra capacity to further increase the temperature of the motor (that is a state where further temperature rise can be accommodated, or a state where the protection of the motor is not necessary), there is a possible risk that the counter value exceeds the threshold, and the motor is accordingly protected.

In one aspect of the present disclosure, it is desirable that a motor is appropriately protected from heat based on a time period during which a load greater than or equal to a specified magnitude is imposed on a motor.

One aspect of the present disclosure provides an electric work machine including a holder, a manual switch, a motor, a drive circuit, an electric current calculation circuit, a time counting circuit, a heat estimation circuit, and a protection circuit. The holder (i) holds a driven tool in an undetachable manner or (ii) holds the driven tool in a detachable manner. The manual switch is manually operated by a user of the electric work machine. The motor drives the driven tool. The drive circuit drives the motor based on the manual switch having been or being manually operated. The electric current calculation circuit calculates an electric current value. The electric current value corresponds to the magnitude of an electric current delivered from a power source to the motor. The time counting circuit measures a load time. The load time corresponds to a time period during which a first load is continuously imposed on the motor. The first load has a specified magnitude or more.

The heat estimation circuit calculates an estimated heat value. The estimated heat value corresponds to an estimated heat generation amount of the motor. The heat estimation circuit calculates the estimated heat value based on (i) the electric current value and (ii) a parameter. The heat estimation circuit changes the parameter based on the load time. The protection circuit performs a protective operation for over temperature protection of the motor, based on the estimated heat value having reached a heat threshold.

In the electric work machine configured as described above, the parameter is used to calculate the estimated heat value. The parameter is changed depending on the load time. Accordingly, in the electric work machine, the motor can be appropriately protected from the heat of the motor (in other words, the protective operation can be appropriately performed) depending on the load time.

In another aspect of the present disclosure, a method is provided. The method includes calculating an estimated heat value based on an electric current value and a parameter. The estimated heat value corresponds to the estimated heat generation amount of the motor. The electric current value corresponds to a magnitude of an electric current delivered from a power source to the motor.

The method also includes varying the parameter based on the load time. The load time corresponds to a time period during which a first load is continuously imposed on the motor. The first load has a specified magnitude or more.

The method further includes performing a protective operation for over temperature protection of the motor based on the estimated heat value having reached a heat threshold.

In this method, the parameter is used to calculate the estimated heat value. The parameter is changed depending on the load time. Accordingly, the motor can be appropriately protected from the heat of the motor (in other words, the protective operation can be appropriately performed) depending on the load time.

BRIEF DESCRIPTION OF THE DRAWINGS

An example embodiment of the present disclosure will be described hereinafter with reference to the accompanying drawings, in which:

FIG. 16 is a block diagram showing a configuration of a protection determiner.

DETAILED DESCRIPTION OF EXEMPLARY EMBODIMENTS

1. Overview of Embodiments

Figure 1:
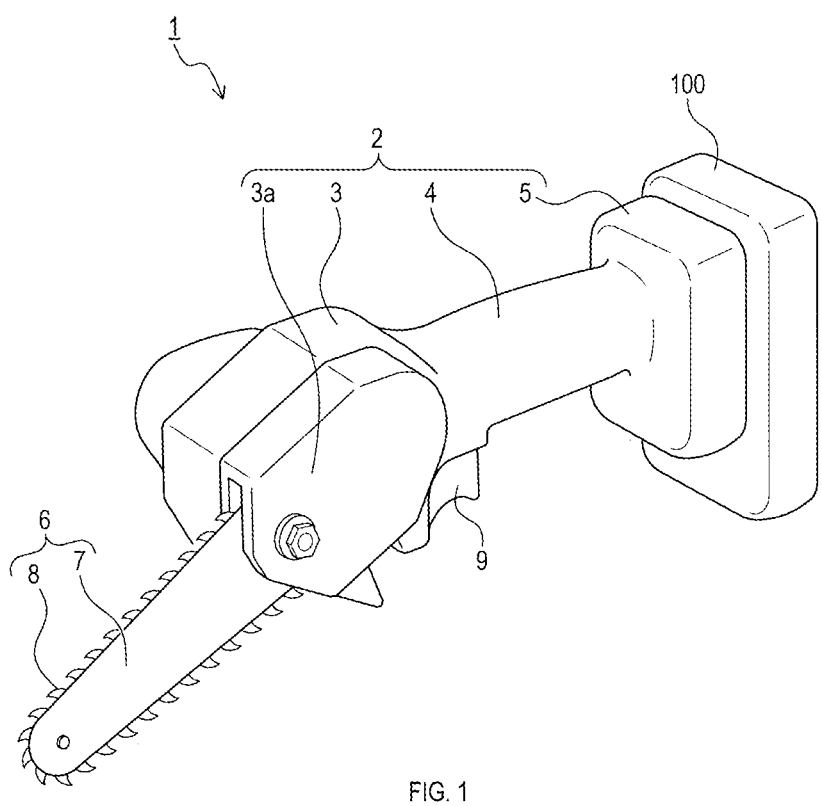
FIG. 1 is a perspective view of an electric work machine in an exemplary embodiment.

An embodiment may provide an electric work machine including at least any one of the following features 1 through 8.

Feature 1: a holder configured to (i) hold a driven tool in an undetachable manner or (ii) hold the driven tool in a detachable manner.

Feature 2: a manual switch configured to be manually operated by a user of the electric work machine.

Feature 3: a motor configured to drive the driven tool.

Feature 4: a drive circuit configured to drive the motor based on the manual switch having been or being manually operated.

Feature 5: an electric current calculation circuit configured to calculate an electric current value. The electric current value corresponds to a magnitude of an electric current supplied (or delivered) from a power source to the motor.

Feature 6: a time counting circuit configured to measure a load time. The load time corresponds to a time period during which a first load is continuously imposed on the motor. The first load has a specified magnitude or more.

Feature 7: a heat estimation circuit configured to calculate an estimated heat value. The estimated heat value corresponds to an estimated heat generation amount of the motor (in other words, an estimated value of the heat generation amount of the motor). The heat estimation circuit is configured to calculate the estimated heat value based on (i) the electric current value (or the electric current value calculated) and (ii) a parameter. The heat estimation circuit is configured to change (or vary) the parameter based on the load time (or the load time measured).

Feature 8: a protection circuit configured to perform a protective operation for over temperature protection (or decreasing the temperature) of the motor based on the estimated heat value (or the estimated heat value calculated) reaching a heat threshold.

The electric work machine including at least the features 1 through 8 can appropriately protect the motor (that is, appropriately perform the protective operation) depending on the load time.

The drive circuit may receive a first electric power from the power source. The drive circuit may generate a second electric power based on the first electric power and supply the second electric power to the motor.

The first load (that is, a load greater than or equal to the specified magnitude) may be given any definitions. For example, a state where a torque greater than or equal to the specified magnitude is imposed on the motor may be defined as a state where the first load is imposed on the motor. A state where the first load is imposed on the motor may be referred to as a first loaded state. A state where a load less than the specified magnitude is imposed on the motor may be referred to as a second loaded state. And, the second loaded state may include a state where no load is imposed on the motor.

The estimated heat value may be any value that directly or indirectly indicates the heat generation amount of the motor. In other words, the estimated heat value may include any dimension or may be shown in any physical unit.

The heat threshold may correspond to an amount of heat having a specified magnitude. In this case, a further increase of the heat generation amount of the motor from the amount of heat having a specified magnitude should be inhibited or may desirably be inhibited. The heat threshold may be determined in any manner. The heat threshold may include the same dimension as the estimated heat value does. The heat threshold may be shown in the same physical unit as the estimated heat value is. The protective operation may include any operations that can inhibit or prevent or reduce further temperature rise of the motor.

In the electric work machine including at least the features 1 through 8, the motor can be appropriately protected from the heat of the motor (in other words, the protective operation can be appropriately performed) depending on the load time.

In one embodiment, the electric work machine may include at least any one of the following features 9 and 10 in addition to or in place of at least any one of the aforementioned features 1 through 8.

Feature 9: the electric current value reaches an electric current threshold based on the first load being imposed on the motor.

Feature 10: the time counting circuit is configured to measure the load time based on the electric current value (or the electric current value calculated).

The electric work machine including at least the features 1 through 10 can appropriately measure the load time based on the electric current value.

The fact that the electric current value is greater than or equal to the electric current threshold may correspond to (or mean) the fact that the first load is added to the motor. Accordingly, a time period during which the electric current value is continuously greater than or equal to the electric current threshold may correspond to the load time. In other words, the load time may at least include a time period during which the electric current value is continuously greater than or equal to the electric current threshold. The time counting circuit may measure a time period during which the electric current value is continuously greater than or equal to the electric current threshold. In this case, thus measured time may correspond to the load time.

In one embodiment, the electric work machine may include the following feature 11 or both of the following features 11 and 12 in addition to or in place of at least any one of the aforementioned features 1 through 10.

Feature 11: the parameter includes a rate of increase of the estimated heat value Feature 12: the heat estimation circuit is configured to, while the electric current value (or the electric current value calculated) is greater than or equal to the electric current threshold, increase the estimated heat value in accordance with the rate of increase.

The electric work machine including at least the features 1 through 12 can readily calculate the estimated heat value.

The rate of increase may be, for example, an increment of the estimated heat value per unit time (for example, per 1 millisecond). The heat estimation circuit may increase the estimated heat value by adding the increment to a current estimated heat value each time the unit time elapses, for example.

In one embodiment, the electric work machine may include the following feature 13 in addition to or in place of at least any one of the aforementioned features 1 through 12.

Feature 13: the heat estimation circuit is configured to raise the rate of increase based on the load time (or the load time measured) having reached a time threshold.

In other words, the heat estimation circuit may increase the heat rate of increase. More specifically, the heat estimation circuit may increase the increment, for example.

The electric work machine including at least the features 1 through 13 can appropriately estimate the estimated heat value depending on the load time. The time threshold may be a specified time.

In one embodiment, the electric work machine may include the following feature 14 or both of the following features 14 and 15 in addition to or in place of at least any one of the aforementioned features 1 through 13.

Feature 14: the heat estimation circuit includes a counter configured to periodically and repeatedly increase (or count up) a count variable (or a counter value) by an increment value while the electric current value (or the electric current value calculated) is greater than or equal to the electric current threshold. The increment value is equivalent to the rate of increase. The counter is also configured to vary the increment value based on the load time (or the load time measured).

Feature 15: the heat estimation circuit includes a heat calculation circuit configured to calculate the estimated heat value based on the count variable.

The electric work machine including at least the features 1 through 12, 14, and 15 can more readily calculate the estimated heat value.

The count variable may correspond to an output value of the counter. The counter may periodically calculate (or update) the count variable by adding the increment value to a current variable. Changing the increment value based on the load time may correspond to changing the rate of increase based on the load time. The count variable may correspond to the estimated heat value calculated. In other words, the heat calculation circuit may calculate the count variable as the estimated heat value.

In one embodiment, the electric work machine may include the following feature 16 or both of the following features 16 and 17 in addition to or in place of at least any one of the aforementioned features 1 through 15.

Feature 16: the counter is configured to set the increment value either to a first value or to a second value based on the load time (or the load time measured).

Feature 17: the second value is greater than the first value.

The electric work machine including at least the features 1 through 12 and 14 through 17 can readily change the parameter (in other words, can readily change the rate of increase) depending on the load time.

In one embodiment, the electric work machine may include at least either one of the following features 18 or 19 in addition to or in place of at least any one of the aforementioned features 1 through 17.

Feature 18: the counter is configured to set the increment value to the first value while the load time (or the load time measured) is less than the time threshold.

Feature 19: the counter is configured to set the increment value to the second value based on the load time (or the load time measured) having reached the time threshold.

The electric work machine including at least the features 1 through 12 and 14 through 19 can appropriately and readily calculate the estimated heat value depending on the load time.

In one embodiment, the electric work machine may include the following feature 20, or the following feature 21, or the following features 20 through 22 in addition to or in place of at least any one of the aforementioned features 1 through 19.

Feature 20: the heat estimation circuit includes a first counter configured to periodically and repeatedly increase (or count up) a first count variable (or a first counter value) by a first increment value while the electric current value (or the electric current value calculated) is greater than or equal to the electric current threshold. The first increment value is equivalent to the rate of increase.

Feature 21: the heat estimation circuit includes a second counter configured to periodically and repeatedly increase (or count up) a second count variable (or a second counter value) by a second increment value while the electric current value (or the electric current value calculated) is greater than or equal to the electric current threshold. The second increment value is equivalent to the rate of increase and is greater than the first increment value.

Feature 22: the heat estimation circuit includes the heat calculation circuit configured to (i) enable (validate) either the first count variable or the second count variable based on the load time (or the load time measured) and (ii) calculate the estimated heat value based on either the first count variable enabled or the second count variable enabled.

The electric work machine including at least the features 1 through 12 and 20 through 22 can more readily calculate the estimated heat value.

The first count variable may correspond to the output value of the first counter. The first counter may periodically calculate (or update) the first count variable by adding the first increment value to a current first count variable. The second count variable may correspond to the output value of the second counter. The second counter may periodically calculate (or update) the second count variable by adding the second increment value to a current second count variable.

In one embodiment, the electric work machine may include at least any one of the following features 23 and 24 in addition to or in place of at least any one of the aforementioned features 1 through 22.

Feature 23: the heat calculation circuit enables the first count variable while the load time (or the load time measured) is less than the time threshold.

Feature 24: the heat calculation circuit enables the second count variable based on the load time (or the load time measured) having reached the time threshold.

The electric work machine including at least the features 1 through 12 and 20 through 24 can appropriately and readily calculate the estimated heat value depending on the load time.

In one embodiment, the electric work machine may include the following feature 25 in addition to or in place of at least any one of the aforementioned features 1 through 24.

Feature 25: the first count variable enabled or the second count variable enabled is equivalent to or approximate to the estimated heat value (or the estimated heat value calculated).

In other words, the heat calculation circuit may calculate either one of the first or second count variables, whichever is enabled, as the estimated heat value.

The electric work machine including at least the features 1 through 12, 20 through 22, and 25 can more readily calculate the estimated heat value.

In one embodiment, the electric work machine may include the following feature 26 or both of the following features 26 and 27 in addition to or in place of at least any one of the aforementioned features 1 through 25.

Feature 26: the heat estimation circuit is configured to, when the electric current value falls to a specified electric current value, (i) hold an instantaneous value and (ii) set the first count variable, the second count variable, and the load time to their respective initial values. The specified electric current value is equal to or less than the electric current threshold. The instantaneous value corresponds to the estimated heat value calculated when the electric current value falls to the specified electric current value.

Feature 27: the heat calculation circuit is configured to add either the first count variable enabled or the second count variable enabled to the instantaneous value to thereby calculate the estimated heat value.

The electric work machine including at least the features 1 through 12, 20 through 22, and 25 through 27 can appropriately calculate the estimated heat value even if a first load fluctuation occurs. The first load fluctuation may include (i) a change of the electric current value from a first magnitude to a second magnitude, and a change of the electric current value from the second magnitude to the first magnitude or (ii) a change of the electric current value from second magnitude to the first magnitude, and a change of the electric current value from the first magnitude to the second magnitude. The first magnitude is less than the specified electric current value. The second magnitude is greater than the specified electric current value.

The initial value may be zero, for example. The initial value may be a specified value that is greater than zero, for example.

In one embodiment, the electric work machine may include the following feature 28 in addition to or in place of at least any one of the aforementioned features 1 through 27.

Feature 28: the specified electric current value is less than the electric current threshold.

The electric work machine including at least the features 1 through 12, 20 through 22, and 25 through 28 can inhibit frequent occurrences of (i) the first count variable being set to the initial value and/or (ii) the second count variable being set to the initial value.

In one embodiment, the electric work machine may include the following features 29 and 30, the following features 29 and 31, or the following features 29 through 31 in addition to or in place of at least any one of the aforementioned features 1 through 28.

Feature 29: the manual switch is configured to be manually moved from its initial position by a user.

Feature 30: the drive circuit is configured to drive the motor based on the manual switch being moved or having been moved from its initial position.

Feature 31: the protection circuit is configured to stop the protective operation based on the manual switch being placed at its initial position.

The electric work machine including at least the features 1 through 8 and 29 through 31 can effectively dissipate heat from the motor. Furthermore, such electric work machine can encourage the user to avoid using the electric work machine in a way the protective operation is performed.

The fact that the manual switch is moved from the initial position may correspond to the fact that a manual operation is performed. The fact that the manual switch moved from the initial position is returned to the initial position may correspond to the fact that the manual operation is deactivated. After the protective operation is initiated, the protection circuit may stop the protective operation in response to the manual operation being deactivated.

In one embodiment, the electric work machine may include the following feature 32, the following features 32 and 33, or the following features 32 through 34 in addition to or in place of at least any one of the aforementioned features 1 through 31.

Feature 32: the protection circuit is configured to perform the protective operation each time the estimated heat value (or the estimated heat value calculated) reaches the heat threshold.

Feature 33: the protection circuit is configured to change (or vary) the heat threshold based on the protection circuit having performed a first Nth protective operation.

Feature 34: The first Nth protective operation corresponds to the protective operation performed firstly or thereafter.

The electric work machine including at least the features 1 through 8 and 29 through 34 can effectively inhibit heat generation of the motor.

In one embodiment, the electric work machine may include the following feature 35 in addition to or in place of at least any one of the aforementioned features 1 through 34.

Feature 35: the protection circuit is configured to lower the heat threshold based on the protection circuit having performed the first Nth protective operation.

In one embodiment, the electric work machine may include the following feature 36 or the following features 36 and 37 in addition to or in place of at least any one of the aforementioned features 1 through 35.

Feature 36: the protection circuit is configured to lower the heat threshold further based on the protection circuit having performed a second Nth protective operation.

Feature 37: the second Nth protective operation corresponds to the protective operation performed firstly or thereafter.

The electric work machine including at least the features 1 through 8 and 29 through 37 can more effectively inhibit heat generation of the motor.

In one embodiment, the electric work machine may include the following feature 38 or the following features 38 and 39 in addition to or in place of at least one of the aforementioned features 1 through 37.

Feature 38: the protection circuit is configured to continue the protective operation based on (i) the protection circuit having performed a third Nth protective operation and (ii) the manual switch being placed at the initial position.

Feature 39: the third Nth protective operation corresponds to the protective operation performed as the second Nth protective operation or thereafter.

The electric work machine including at least the features 1 through 8 and 29 through 39 can more effectively protect the motor from overheating.

In one embodiment, the electric work machine may include the following feature 40, the following features 40 and 41, the following features 40 and 42, the following features 40 through 43, the following features 40 through 42 and 44, or the following features 40 through 44 in addition to or in place of at least any one of the aforementioned features 1 through 39.

Feature 40: a power source circuit configured to deliver (or supply) electric power to the protection circuit for the operation of the protection circuit.

Feature 41: a third counter configured to increase a third count variable each time the protective operation is performed.

Feature 42: the protection circuit is configured to operate with the electric power delivered from the power source circuit.

Feature 43: the protection circuit is configured to continue the protective operation based on (i) the third count variable having reached a value that corresponds to the third Nth protective operation and (ii) the manual switch being placed at its initial position.

Feature 44: the protection circuit is configured to, based on a delivery of the electric power being interrupted while the protective operation is performed, (i) stop the protective operation and (ii) set the third count variable to zero (or clear the third count variable).

The electric work machine including at least the features 1 through 8 and 29 through 44 can more effectively protect the motor from overheating.

In one embodiment, the electric work machine may include the following feature 45 in addition to or in place of at least any one of the aforementioned features 1 through 44.

Feature 45: the protection circuit is configured to decelerate or stop the motor in the protective operation.

In one embodiment, the electric work machine may include a control circuit.

In one embodiment, the control circuit may include the electric current calculation circuit, the time counting circuit, the heat estimation circuit, and/or the protection circuit. In one embodiment, the control circuit may include the counter and/or the heat calculation circuit. In one embodiment, the control circuit may include the first counter, the second counter, and/or the heat calculation circuit.

In one embodiment, the control circuit may include a microcomputer.

In one embodiment, the control circuit may include a combination of electronic components such as a discrete element, an application-specific IC (ASIC), an application-specific standard product (ASSP), a programmable logic device such as a field programmable gate array (FPGA), or a combination of the above in place of or in addition to the microcomputer.

Examples of the motor include a brushed DC motor, a brushless DC motor, and an AC motor. Examples of the motor driving circuit include a bridge circuit and a full-bridge circuit.

Examples of the electric work machine include various electric work machines used in a work site such as home carpentry, manufacturing, gardening, and construction; and more specifically, electric power tools for stone processing, metal processing, or wood processing, a working machine for gardening, and a device for improving a work site environment; more specifically, an electric blower, an electric hammer, an electric hammer drill, an electric drill, an electric screwdriver, an electric wrench, an electric grinder, an electric circular saw, an electric reciprocating saw, an electric jigsaw, an electric cutter, an electric handsaw, an electric pruning saw, an electric chainsaw, an electric planer, an electric nailer (including a tacker), an electric hedge trimmer, an electric lawn mower, an electric lawn trimmer, an electric grass cutter, an electric cleaner, an electric sprayer, an electric spreader, an electric dust collector, and a battery-powered wheel barrow (or a battery-powered dolly or a battery-powered hand truck).

In one embodiment, a method including at least one of the following features 46 through 48 may be provided.

Feature 46: calculating an estimated heat value based on an electric current value and a parameter. The estimated heat value corresponds to an estimated heat generation amount of the motor. The electric current value corresponds to a magnitude of an electric current supplied (or delivered) from a power source to the motor.

Feature 47: changing (or varying) the parameter based on the load time. The load time corresponds to a time period during which a first load is continuously imposed on the motor. The first load has a specified magnitude or more.

Feature 48: performing a protective operation for over temperature protection (or decreasing the temperature) of the motor, based on the estimated heat value (or the estimated heat value calculated) having reached a heat threshold.

According to the method including at least the features 46 through 48, the motor can be appropriately protected (that is, the protective operation is appropriately performed) depending on the load time.

In one embodiment, the features 1 through 48 may be combined in any manner. In one embodiment, any of the features 1 through 48 may be removed.

2. Specific Exemplary Embodiments

Hereinafter, specific exemplary embodiments will be explained. These specific exemplary embodiments are merely examples and thus the present disclosure can be implemented in any forms without being limited to these embodiments.

2-1. Overview of Electric Work Machine

As shown in FIG. 1, an electric work machine 1 in the present embodiment is in a form of an electric handsaw (or a pruning saw), for example. An electric handsaw is used, for example, as a substitute for a handsaw to easily cut thin branches. An electric handsaw can also be explained as a downsized chainsaw. A chainsaw is used, for example, to cut logs and thick branches. A user of the electric work machine 1 can readily prune, for example, roadside trees, garden trees, and orchard trees by using the electric work machine 1.

As shown in FIG. 1, the electric work machine 1 includes a main body 2. The main body 2 includes a motor housing 3. The motor housing 3 houses a motor 10 (see FIG. 2). The motor 10 is, for example, a brushless motor in the present embodiment. The motor 10 includes a permanent-magnet-type rotor (not illustrated) and a stator (not illustrated).

The motor housing 3 also houses a transmission mechanism (not illustrated) and a sprocket (not illustrated). The transmission mechanism transmits the rotational force of the motor 10 to the sprocket. The sprocket rotates in response to the rotation of the motor 10.

The main body 2 includes a grip 4. The grip 4 is arranged to extend from the motor housing 3. The grip 4 is gripped by a user of the electric work machine 1, for example. The grip 4 includes a trigger 9. The user can manually operate (for example, pull) the trigger 9 while gripping the grip 4. When the trigger 9 is not manually operated, the trigger 9 is placed at its initial position. The trigger 9 is moved from the initial position when the trigger 9 is manually operated.

In the present embodiment, a drive switch 9a (see FIG. 2) is turned ON while the trigger 9 is manually operated. The drive switch 9a is turned OFF when the trigger 9 is not manually operated. The trigger 9 may take a form of a so-called alternate-type trigger. After being turned ON by a manual operation, the alternate-type trigger 9 remains in ON state even if the manual operation is deactivated. The trigger 9 is turned OFF when it is manually operated again after the manual operation is deactivated. Alternatively, the drive switch 9a may be an alternate-type drive switch.

The main body 2 includes a battery port 5. The battery port 5 is arranged to extend from the grip 4. A battery pack 100 is attached in a detachable manner on the bottom portion of the battery port 5. The battery pack 100 includes a battery 101 (see FIG. 2). The battery 101 may be a rechargeable battery. The battery 101 may be, for example, a lithium-ion battery. The battery 101 may be a rechargeable battery different from the lithium-ion battery.

Figure 2:
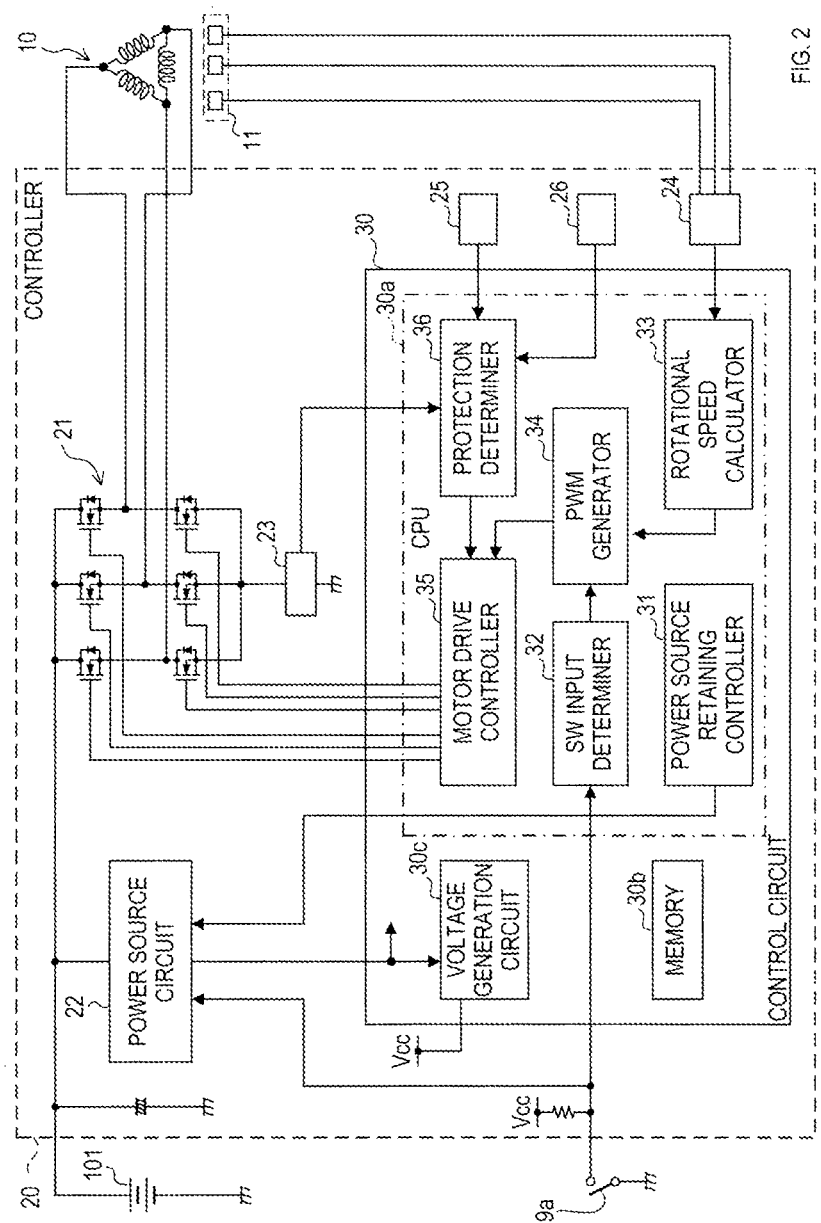
FIG. 2 is a block diagram of an electrical configuration of the electric work machine.

The main body 2 includes a controller 20 (see FIG. 2). The controller 20 may be housed in the motor housing 3, for example.

The electric work machine 1 includes a working tool 6. The working tool 6 includes a guide bar 7, and a chain blade 8. The main body 2 includes a holder 3a. The holder 3a holds the working tool 6 in a detachable manner. In other words, each of the guide bar 7 and the chain blade 8 is attached to the main body 2 in a detachable manner. In the present embodiment, the holder 3a is disposed on the motor housing 3. The holder 3a may include the aforementioned sprocket. A part of (for example, the guide bar 7) or all of the working tool 6 may be retained by the main body 2 in an undetachable manner.

The guide bar 7 has a long plate-like shape. The guide bar 7 is attached to the holder 3a (or to the motor housing 3) with an end part of the guide bar 7 being accommodated in the holder 3a (or in the motor housing 3).

The chain blade 8 is attached to the guide bar 7 along the outer circumference of the guide bar 7. The guide bar 7 in the present embodiment includes a groove formed along the outer circumference of the guide bar 7. The chain blade 8 is fitted into the groove along substantially the entire length of the guide bar 7. The chain blade 8 is movable along the groove (in other words, along the outer circumference of the guide bar 7).

The chain blade 8 meshes with the sprocket in the holder 3a. The rotational force of the motor 10 is transferred to the chain blade 8 via a transmission mechanism and the sprocket. Accordingly, the chain blade 8 is driven to move along the outer circumference of the guide bar 7. The user can cut a target object to be cut by abutting thus driven chain blade 8 against the target object.

2-2. Electrical Configuration of Electric Work Machine

As shown in FIG. 2, the electric work machine 1 includes the aforementioned motor 10, the aforementioned drive switch 9a, and the controller 20. The controller 20 is supplied with electric power of the battery 101 (hereinafter referred to as "battery power") from the battery pack 100 attached to the battery port 5. The motor 10 and the drive switch 9a is electrically coupled to the controller 20.

The motor 10 receives the battery power via a drive circuit 21 which will be explained later. More specifically, the battery power is input to the drive circuit 21. The drive circuit 21 converts the input battery power to three-phase power and supplies the three-phase power to the motor 10. The motor 10 of the present embodiment includes three wound wires (not illustrated). The three-phase power is supplied to these three wound wires. The motor 10 rotates as a result of the three wound wires being supplied with the three-phase power.

As shown in FIG. 2, the electric work machine 1 includes a rotational-position sensor 11. The rotational-position sensor 11 outputs rotational position information. The rotational position information changes depending on the rotational position of the motor 10 (more specifically, depending on the rotational position of a rotor). The rotational position information in the present embodiment includes three positional signals. The rotational position information is input to a rotational-position detection circuit 24 which will be explained later.

The rotational-position sensor 11 in the present embodiment includes three Hall sensors. These three Hall sensors are arranged separately from each other with intervals of an angle corresponding to an electrical angle of 120 degrees along the direction of rotation of the rotor. Each of the aforementioned three positional signals is output from the corresponding one of the three Hall sensors.

The controller 20 includes a control circuit 30. The control circuit 30 controls the rotation of the motor 10.

The drive switch 9a includes a first end coupled to the controller 20, and a second end coupled to a ground line. The voltage at the first end of the drive switch 9a functions as a trigger detection signal. The trigger detection signal shows whether the drive switch 9a is turned ON (in other words, whether the trigger 9 is being manually operated). The trigger detection signal may also show the amount the trigger 9 is moved (or an amount of manipulation) from its initial position. The trigger detection signal is input to the controller 20.

The controller 20 includes the aforementioned drive circuit 21. The drive circuit 21 is coupled to the motor 10. More specifically, the drive circuit 21 is disposed on the electric power path. The electric power path extends from the positive electrode of the battery 101 to the negative electrode of the battery 101 via the motor 10. As mentioned above, the drive circuit 21 (i) receives the battery power from the battery 101, (ii) generates the three-phase power from the battery power, and (iii) supplies the generated three-phase power to the motor 10.

As shown in FIG. 2, the drive circuit 21 in the present embodiment includes a three-phase full-bridge circuit. The three-phase full-bridge circuit includes six switches. These six switches include three high-side switches and three low-side switches. Each of these six switches may take any form. In the present embodiment, each of the six switches are, for example, an N-channel metal oxide semiconductor field-effect transistor (MOSFET). Other than the three-phase full-bridge circuit, the drive circuit 21 may include a circuit of any form.

The controller 20 includes a power source circuit 22. The power source circuit 22 is coupled to the electric power path and receives the battery power from the electric power path. The power source circuit 22 also receives the trigger detection signal. The power source circuit 22 may also receive a power source retaining signal from the control circuit 30.

The power source circuit 22 can detect whether the drive switch 9a is turned ON based on the trigger detection signal. The power source circuit 22 delivers a first voltage to the control circuit 30 based on detecting that the drive switch 9a is turned ON. The power source circuit 22 generates the first voltage from the battery power. The first voltage is a DC voltage. The first voltage may have any value. In the present embodiment, the first voltage is the same as or substantially equal to the voltage of the battery 101. The power source circuit 22 may output the voltage of the battery 101 as the first voltage via a switch (not illustrated).

The control circuit 30 activates and operates by receiving the first voltage from the power source circuit 22. The control circuit 30 stops its operation when the supply of the first voltage to the control circuit 30 is interrupted. The control circuit 30 delivers the power source retaining signal to the power source circuit 22 based on being activated by receiving the first voltage.

In response to the drive switch 9a being turned ON, the power source circuit 22 initiates output of the first voltage. After initiating the output of the first voltage, the power source circuit 22 keeps outputting the first voltage as long as it receives the power source retaining signal even if the drive switch 9a is turned OFF. The power source circuit 22 stops the output of the first voltage when the input of the power source retaining signal from the control circuit 30 stops. The operation of the control circuit 30 stops when the output of the first voltage stops.

The controller 20 includes an electric current detection circuit 23. The electric current detection circuit 23 outputs an electric current detection signal. The electric current detection signal corresponds to the magnitude (or the value) of the electric current that flows through the motor 10. The electric current detection circuit 23 in the present embodiment is disposed on the negative side path of the aforementioned electric power path, which is between the drive circuit 21 and the negative electrode of the battery 101. The electric current detection circuit 23 in the present embodiment outputs the electric current detection signal in accordance with the magnitude of the electric current that has flown through the negative side path. The electric current detection circuit 23 may include, for example, a resistor (not illustrated) disposed on the negative side path. In this case, the electric current detection circuit 23 may output the electric current detection signal in accordance with the magnitude of voltage between both ends of the resistor. The electric current detection signal is input to the control circuit 30 (more specifically, to a CPU 30a).

The controller 20 includes the rotational-position detection circuit 24. The rotational-position detection circuit 24 receives three positional signals from the rotational-position sensor 11. The rotational-position detection circuit 24 detects the rotational position of the motor 10 based on the three positional signals. The rotational-position detection circuit 24 outputs a rotational position signal that corresponds to the detected rotational position. The rotational position signal is input to the control circuit 30 (more specifically, to the CPU 30a).

The controller 20 includes a battery voltage detection circuit 25. The battery voltage detection circuit 25 detects a value of voltage of the battery 101 and outputs a battery voltage signal that shows the detected value of voltage. The battery voltage signal is input to the control circuit 30 (more specifically, to the CPU 30a).

The controller 20 includes a controller temperature detection circuit 26. The controller temperature detection circuit 26 detects the temperature of the controller 20 and outputs a controller temperature signal that shows the detected temperature. The controller temperature signal is input to the control circuit 30 (more specifically, to the CPU 30a).

The control circuit 30 includes a voltage generation circuit 30c. The first voltage that is input to the control circuit 30 is then input to the voltage generation circuit 30c. While receiving the first voltage, the voltage generation circuit 30c generates a direct-current second voltage Vcc from the first voltage and outputs the second voltage Vcc. The second voltage Vcc may include any value. In the present embodiment, the value of the second voltage Vcc is less than the value of the first voltage. The second voltage Vcc is supplied to each element in the controller 20 and used as a power-supply power in each element.

In the present embodiment, the control circuit 30 includes the CPU 30a, and a memory 30b. The memory 30b may include a semiconductor memory such as a ROM, a RAM, an NVRAM, and a flash memory. In other words, the control circuit 30 in the present embodiment takes the form of a microcomputer or a microcontrol unit (MCU).

The control circuit 30 performs its functions by executing a program stored in a non-transitory tangible storage medium. In the present embodiment, the memory 30b is the non-transitory tangible storage medium that stores the program. In the present embodiment, the memory 30b stores a program for a main process (see FIG. 8), which will be explained later.

A part of or all of the functions performed by the control circuit 30 may be achieved by an execution of a program (that is, by software processing), or by one or more pieces of hardware (that is, by a hard wired circuit). In addition to or in place of the microcomputer, the control circuit 30 may include, for example, a logic circuit including electronic components, an application specific IC such as an ASIC and/or an ASSP, and a programmable logic device, such as an FPGA, that can construct a logic circuit demanded.

The trigger detection signal is input to the CPU 30a in the control circuit 30. The second voltage Vcc is imposed on the first end of the drive switch 9a via the resistor. Accordingly, while the second voltage Vcc is generated, the value of voltage of the trigger detection signal changes depending on the state of the drive switch 9a. The CPU 30a can detect the state of the drive switch 9a based on the value of voltage of the trigger detection signal.

The CPU 30a includes a power source retaining controller 31, a switch input determiner 32, a rotational speed calculator 33, a pulse-width modulation (PWM) generator 34, a motor drive controller 35, and a protection determiner 36. The power source retaining controller 31, the switch input determiner 32, the rotational speed calculator 33, the pulse-width modulation generator 34, the motor drive controller 35, and the protection determiner 36 are in fact functions achieved by a software. In other words, the power source retaining controller 31, the switch input determiner 32, the rotational speed calculator 33, the pulse-width modulation generator 34, the motor drive controller 35, and the protection determiner 36 individually correspond to functions achieved by an execution of a software by the CPU 30a.

The CPU 30a is activated based on the first voltage being supplied to the control circuit 30. In response to the activation of the CPU 30a, the power source retaining controller 31 delivers the power source retaining signal to the power source circuit 22. The power source retaining controller 31 basically continues to output the power source retaining signal while the CPU 30a is in operation. However, if the time period during which the drive switch 9a is continuously tuned OFF (that is, the trigger 9 is continuously turned OFF) reaches a power-source-OFF determination time period TO after the activation of the CPU 30a, the power source retaining controller 31 stops the output of the power source retaining signal. Accordingly, the supply of the first voltage to the control circuit 30 is stopped, and the operation of the control circuit 30 is stopped.

The switch input determiner 32 determines whether the drive switch 9a is turned ON based on the trigger detection signal. The switch input determiner 32 delivers the determination result to the PWM generator 34.

The rotational speed calculator 33 calculates the rotational speed of the motor 10 based on the rotational position signal. The rotational speed calculator 33 delivers the calculated rotational speed to the PWM generator 34.

The PWM generator 34 receives the determination result from the switch input determiner 32 and receives the rotational speed from the rotational speed calculator 33. The PWM generator 34 then generates a PWM signal based on the determination result and the rotational speed. The PWM signal is a control signal to drive the motor 10. In other words, the PWM signal is a signal whose pulse width is modulated in accordance with the value of electric current that should be supplied to the motor 10. The PWM generator 34 delivers the PWM signal to the motor drive controller 35.

The PWM signal has a duty ratio. In other words, the PWM generator 34 controls the electric current that should be supplied to the motor 10 by adjusting the duty ratio.

The motor drive controller 35 receives the PWM signal from the PWM generator 34. The motor drive controller 35 generates a control command based on the PWM signal. The control command is for commanding ON and OFF to each of the six switches of the drive circuit 21. At least one of the six switches can be turned ON or OFF in accordance with the duty ratio indicated by the PWM signal.

The motor drive controller 35 delivers the control command to the drive circuit 21. Accordingly, the aforementioned three-phase power is supplied from the drive circuit 21 to the motor 10, and the motor 10 is rotated thereby.

The protection determiner 36 includes a protection function. The protection function monitors the state of the electric work machine 1. The protection function also protects the electric work machine 1 (mainly protects the motor 10) in accordance with the monitoring result. For example, the protection determiner 36 monitors the battery voltage based on the battery voltage signal from the battery voltage detection circuit 25. The protection determiner 36 forcibly stops the motor 10 if the value of the battery voltage falls below, for example, a specified value. More specifically, the protection determiner 36 outputs a stop command to the motor drive controller 35. The stop command commands the motor drive controller 35 to stop the motor 10. In response to receiving the stop command, the motor drive controller 35 stops outputting the control command to the drive circuit 21 to thereby stop the motor 10. For example, the protection determiner 36 monitors the temperature of the controller 20 based on the controller temperature signal from the controller temperature detection circuit 26. The protection determiner 36 forcibly stops the motor 10 if the temperature of the controller 20 reaches, for example, a specified temperature. In this case, the protection determiner 36 may also output the stop command to the motor drive controller 35.

The protection determiner 36 also includes an overload protection function. When the motor 10 is driven with an excessive load, the temperature of the motor 10 (more specifically, the temperature of the wound wire, for example) rises, which may cause malfunctioning of the motor 10. The overload protection function reduces or prevents malfunctioning of the motor 10 caused by overheating of the motor 10.

The protection determiner 36 functions as shown in FIG. 16 based on software. More specifically, the protection determiner 36 includes an electric current calculation circuit 51, a time counting circuit 52, a heat estimation circuit 53, and a protection circuit 54. The heat estimation circuit 53 includes a counter 56, a heat calculation circuit 57, and a protective operation counter 58. The counter 56 includes a first counter 56a, and a second counter 56b.

The electric current calculation circuit 51 obtains an electric current detection value based on the electric current detection signal from the electric current detection circuit 23. The electric current detection value corresponds to the magnitude of electric current that flows through the motor 10. Specifically, in the present embodiment, the electric current detection value corresponds to the magnitude of electric current that flows from the drive circuit 21 to the negative electrode of the battery 101 via the electric current detection circuit 23. The time counting circuit 52 measures a load time which will be explained later.

The heat estimation circuit 53 estimates the amount of heat generation (heat generation amount) of the motor 10 based on the electric current detection value. The protection circuit 54 performs the protective operation (or protection process) based on the heat generation amount thus estimated (hereinafter referred to as "estimated heat value") having reached a specified heat threshold (or a specified protection threshold). The protective operation may include any operations that can protect the motor 10 from over temperature (or decrease the temperature of the motor 10). The protective operation may include, for example, decelerating or stopping the motor 10. More specifically, the protective operation may include outputting a protection command to the motor drive controller 35. The protection command commands the motor drive controller 35 to decelerate or stop the motor 10. In response to receiving the protection command, the motor drive controller 35 stops outputting the control command to the drive circuit 21 or varies the control command to thereby decelerate or stop the motor 10. In the present embodiment, the protective operation includes stopping the motor 10 as one example. The protection determiner 36 may determine that the motor 10 is in an overloaded state or is close to the overloaded state based on the estimated heat value having reached the heat threshold. The protective operation counter 58 measures the number of times the protective operation is performed.

The electric current detection circuit 23 technically does not always detect the electric current that actually flows through the motor 10. For example, the electric current that circulates between the motor 10 and the drive circuit 21 (hereinafter referred to as "circulating current") is not detected by the electric current detection circuit 23.

Accordingly, in the present embodiment, the electric current calculation circuit 51 calculates the value of electric current that actually flows through the motor 10 (hereinafter referred to as "actual electric current value") based on the electric current detection signal as mentioned later. The protection determiner 36 performs the overload protection function based on thus calculated actual electric current value. However, the protection determiner 36 may perform the overload protection function based on the electric current detection value without calculating the actual electric current value.

2-3. Overload Protection Function

Hereinafter, the overload protection function will be explained in detail. Features of the overload protection function will be briefly explained first with reference to FIGS. 3 and 4. The overload protection function will then be explained in detail with reference to FIGS. 5 through 15.

2-3-1. Overview of Overload Protection Function

Figure 3:
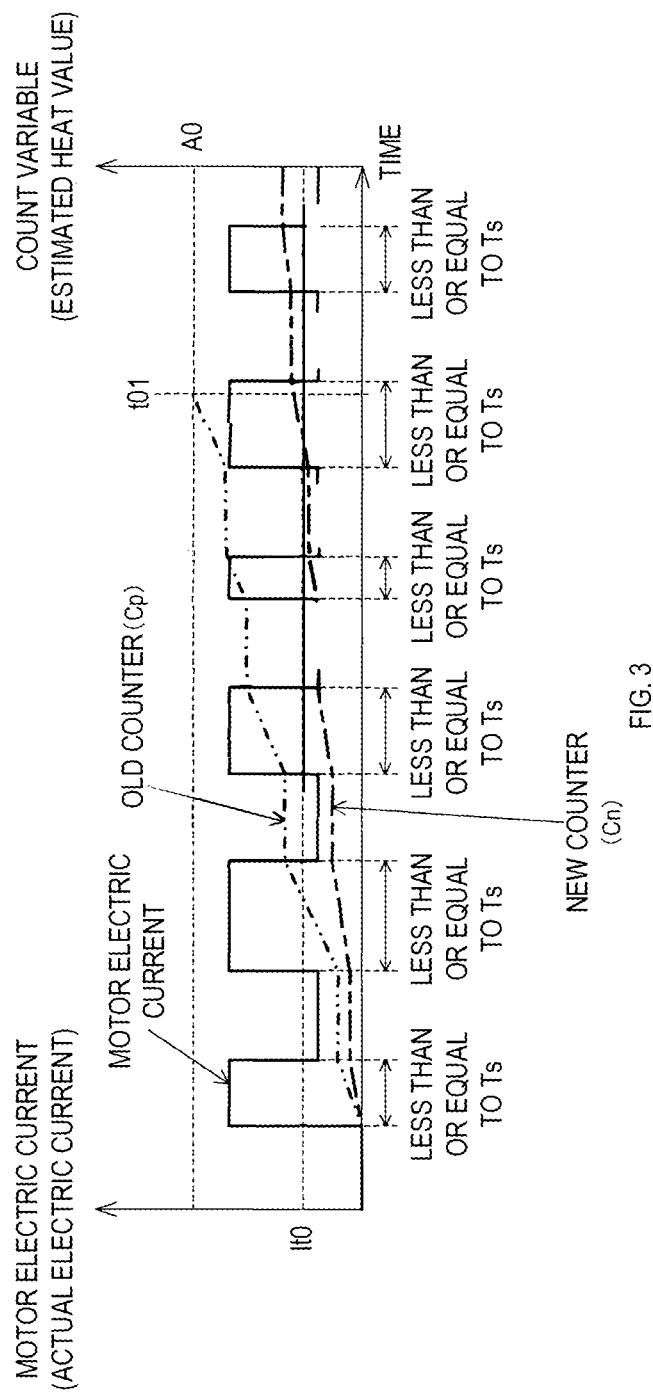
FIG. 3 is a time chart briefly describing a first operation example of the electric work machine.
Figure 4:
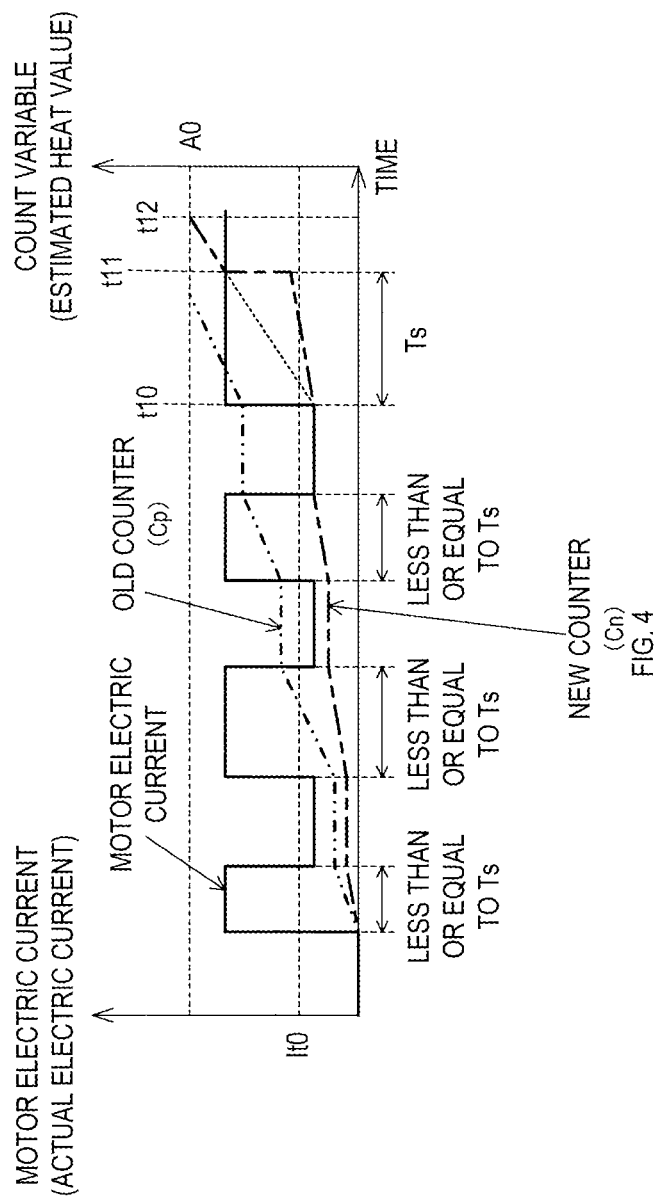
FIG. 4 is a time chart briefly describing a second operation example of the electric work machine.

FIGS. 3 and 4 are simplified schematic representations of the operation examples of the overload protection function provided for easy understanding of the overload protection function.

As mentioned above, the overload protection function includes estimation of the heat generation amount of the motor 10 based on the electric current detection value (more specifically, based on the actual electric current value in the present embodiment). The heat generation amount can be estimated as follows, for example. A counter (hereinafter referred to as "old counter") configured such that a count variable (or, a counter value) increases as shown in a two-dot chain line in FIG. 3 is prepared. Hereinafter, the count variable of the old counter is referred to as an "old count variable Cp" (or old counter value Cp). The old count variable Cp is periodically and repeatedly increased (or added, or counted up) in increments of a specified increment value Xp during a time period in which the actual electric current value is greater than or equal to a specified electric current threshold It0. The old count variable Cp corresponds to the estimated heat value. The aforementioned protective operation is performed at a time (time t01) when the old count variable Cp (that is, the estimated heat value) reaches a specified heat threshold A0.

When the electric current of the electric current threshold It0 continuously flows through the motor 10, the motor 10 may be overheated, causing malfunction of the motor 10. When the old counter value Cp reaches the heat threshold A0, it may cause overheating (in other words, the overloaded state) of the motor 10.

The increment value Xp of the old counter is a value that is determined under the assumption that the ratio of the time spent in a first loaded state to the time spent in a second loaded state (or, a low-load-imposed state) during a certain time period when the motor 10 continuously rotates is relatively high. In other words, the increment value Xp is a value that is determined under the assumption that, in the certain time period, the time spent in the first loaded state is longer than the time spent in the second loaded state.

The first loaded state is a state where a load greater than or equal to a specified magnitude is imposed on the motor 10. In the present embodiment, when a load greater than or equal to a specified magnitude is imposed on the motor 10, the actual electric current value (or the electric current detection value) greater than or equal to the electric current threshold It0 flows through the motor 10. Thus, in the present embodiment, the first loaded state corresponds to a state where the actual electric current value (or the electric current detection value) is greater than or equal to the electric current threshold It0. The second loaded state corresponds to a state where, for example, a load less than the specified magnitude or no load is imposed on the motor 10. In the present embodiment, the second loaded state corresponds to a state where the actual electric current value (or the electric current detection value) is less than the electric current threshold It0.

The increment value Xp of the old counter is determined under the assumption that the electric work machine is used in a manner that the second loaded state lasts for a short period of time and the heat of the motor 10 is not easily dissipated. In other words, the increment value Xp is determined under the assumption that the electric work machine is used in a manner that the temperature of the motor 10 readily increases despite an occurrence of the second loaded state.

Accordingly, the overload protection function using the old counter can provide more appropriate protection in accordance with the actual temperature of the motor 10 as the aforementioned ratio becomes higher.

Meanwhile, it can be assumed that the electric work machine 1 in the present embodiment is used in a manner that, during the rotation of the motor 10, (i) the first loaded state and the second loaded state are alternately repeated and (ii) the second loaded state is relatively longer.

More specifically, in an operation to cut a tree, there may be a time period in which the electric work machine 1 is actually cutting the tree (corresponds to the time spent in the first loaded state) and a time period in which the electric work machine 1 is not cutting the tree and idling the motor 10 (corresponds to the time spent in the second loaded state) alternately occurring in a certain period of time during which the motor 10 continuously rotates. Moreover, the ratio of the time spent in the first loaded state to the time spent in the second loaded state in the aforementioned certain period of time is likely to be relatively low. In other words, the time spent in the second loaded state is likely to be relatively long.

If the electric work machine 1 is used in a manner that time spent in the second loaded state becomes longer, a large amount of heat can be dissipated from the motor 10 during the second loaded state. Accordingly, even if the temperature of the motor 10 increases during the first loaded state, there is a low possibility that the temperature of the motor 10 increases up to the point where a protective operation is required. Thus, in the electric work machine 1 in the present embodiment, the motor 10 may be excessively protected if the estimated heat value is calculated based on the aforementioned old counter.

In other words, there is a possibility that the estimated heat value calculated is greater than the actual heat generation amount of the motor 10. In this case, a protective operation may be performed even when it is not necessary. For example, in FIG. 3, the old count variable Cp reaches the heat threshold A0 at time t01. However, the actual heat generation amount of the motor 10 is likely to be less than the heat generation amount corresponding to the heat threshold A0.

In the present embodiment, the rate of increase of the estimated heat value is changed based on the load time, so that the estimated heat value is calculated more appropriately in accordance with the assumed manner the electric work machine 1 is used. More specifically, the estimated heat value is calculated by a counter (hereinafter referred to as "new counter") the increment value of which is changed based on the load time. Hereinafter, the count variable of the new counter is referred to as "new count variable Cn" (or new counter value Cn). The counter 56 in FIG. 16 corresponds to the new counter.

The load time corresponds to a time period during which the motor 10 is in the first loaded state. More specifically, in the present embodiment, the load time corresponds to a time period during which the first loaded state continues. In other words, the beginning of the load time is when the state of the motor 10 is changed from the second loaded state to the first loaded state. The load time ends when the state of the motor 10 returns to the second loaded state after the aforementioned beginning.

The new counter sets the increment value to a first increment value X1 while the load time is equal to or less than a time threshold Ts. The first increment value X1 is less than the increment value Xp of the old counter. Therefore, as illustrated in FIG. 3, the new count variable Cn is periodically and repeatedly increased (or added, or counted up) in increments of the first increment value X1 while (i) the motor 10 is in the first loaded state (that is, the actual electric current value is greater than or equal to the electric current threshold 110) and (ii) the load time is less than the time threshold Ts. Accordingly, the new count variable Cn (that is, the estimated heat value) at the time t01 is close to the actual heat generation amount (or an actual temperature rise) of the motor 10 and less than the heat threshold A0. Thus, a protective operation is not yet performed at the time t01.

Meanwhile, if the electric work machine 1 is used in a manner that the load time is longer than an assumed time, there is a possibility that the temperature of the motor 10 rises faster (in other words, the heat generation amount increases). Thus, the new counter sets the increment value to a second increment value X2 if the load time exceeds the time threshold Ts. The second increment value X2 is greater than the first increment value X1.

In an operation example shown in FIG. 4, the new count variable Cn is periodically increased in increments of the first increment value X1 until a time t11. Meanwhile, in the operation example shown in FIG. 4, the first loaded state that begins at a time t10 continues past the time t11. The time period from the time t10 to the time t11 corresponds to the time threshold Ts. In other words, the first loaded state that begins at the time t10 continues longer than the time threshold Ts. Accordingly, when the load time reaches the time threshold Ts at the time t11, the increment value is changed to the second increment value X2. Moreover, in the present embodiment, the new count variable Cn is increased at the time t11. More specifically, the new count variable Cn is changed to a long-load-time assumed value. The long-load-time assumed value corresponds to the new count variable Cn at the time t11 that is periodically increased in increments of the second increment value X2 from the time t10.

This is considered that a first new counter and a second new counter are coexisting. The first new counter corresponds to the new counter that uses the first increment value X1. The second new counter corresponds to the new counter that uses the second increment value X2. It can be considered that the new count variable Cn of the first new counter is used when the load time is equal to or less than the time threshold Ts, and the new count variable Cn of the second new counter is used after the load time reaches the time threshold Ts. The first counter 56a in FIG. 16 corresponds to the first new counter; the second counter 56b in FIG. 16 corresponds to the second new counter.

As mentioned above, the temperature rise of the motor 10 due to an increase of the load time can be appropriately estimated by increasing the new count variable Cn itself as well as the increment value when the load time reaches the time threshold Ts. When the load time reaches the time threshold Ts, only either one of an increase of the increment value or an increase of the new count variable Cn itself may be performed.

In the example in FIG. 4, the load time continues after the time t11, and the new count variable Cn reaches the heat threshold A0 at time t12. Then, a protective operation is performed at time t12. When the load time exceeds the time threshold Ts as just described, the protective operation is performed more promptly than that of when an increase of the new count variable Cn using the first increment value X1 is continued.

2-3-2. Explanation of Overload Protection Function

Figure 5:
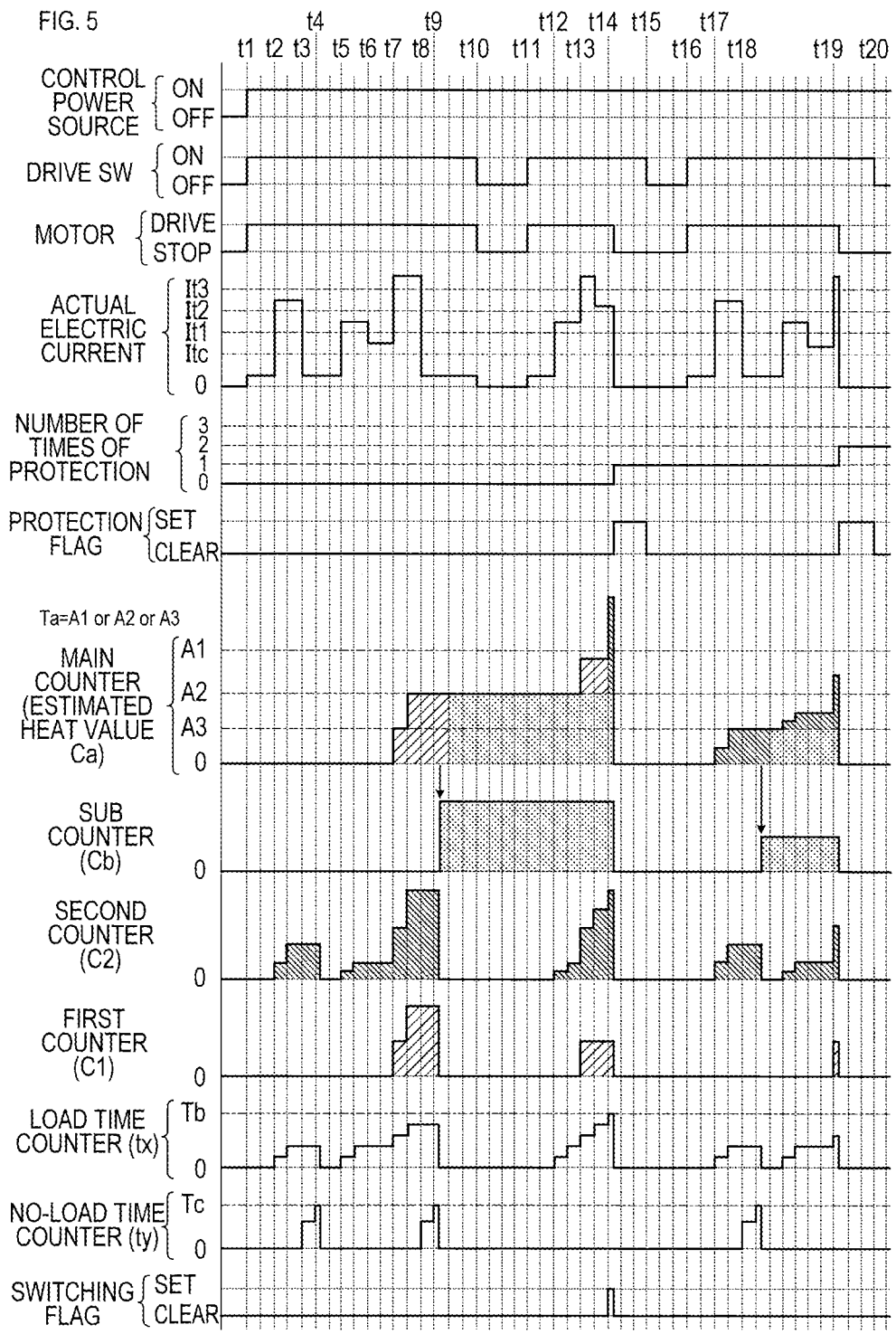
FIG. 5 is a time chart showing a part of a specific operation example of the electric work machine.
Figure 6:
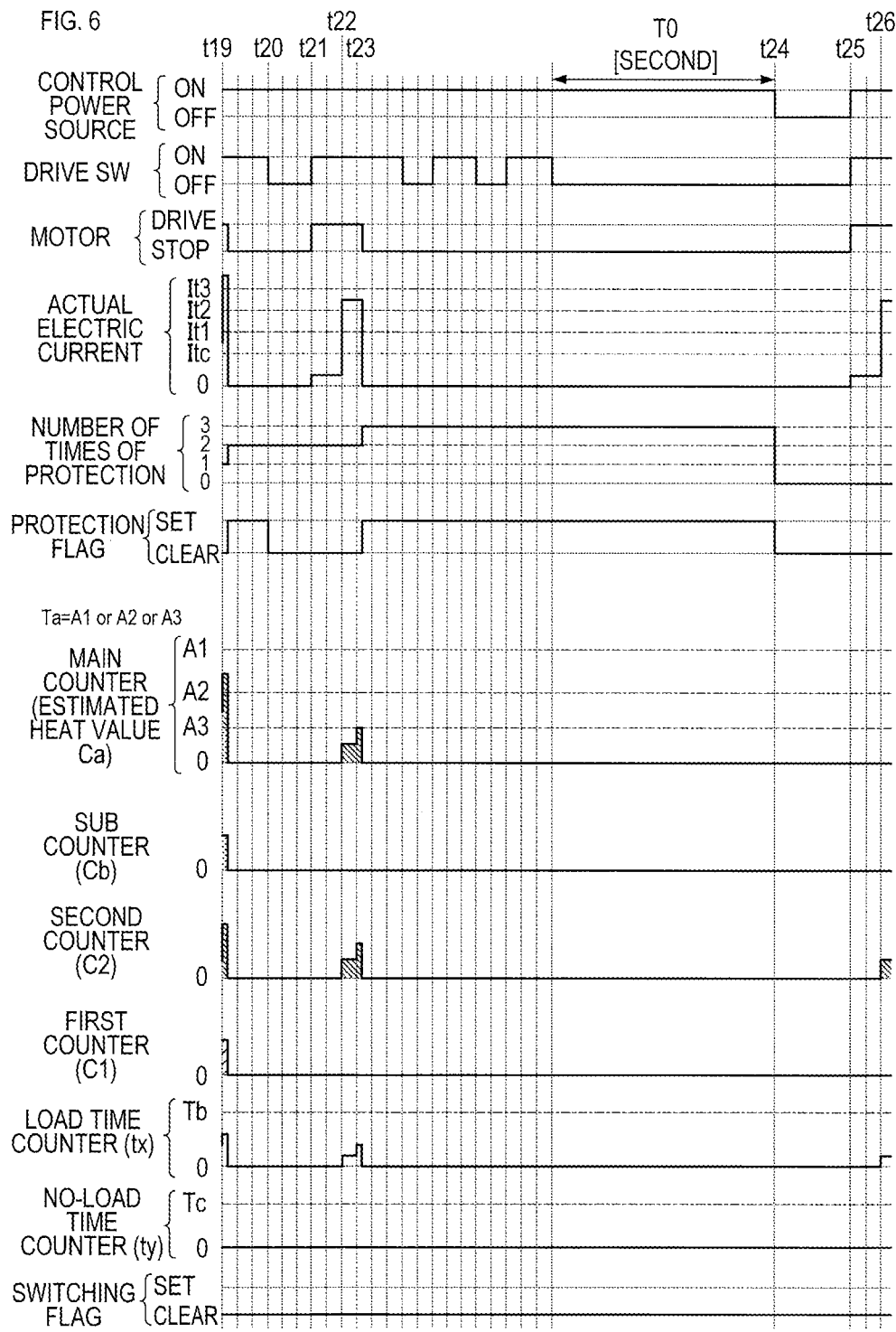
FIG. 6 is a time chart showing another part of the specific operation example of the electric work machine.
Figure 7:
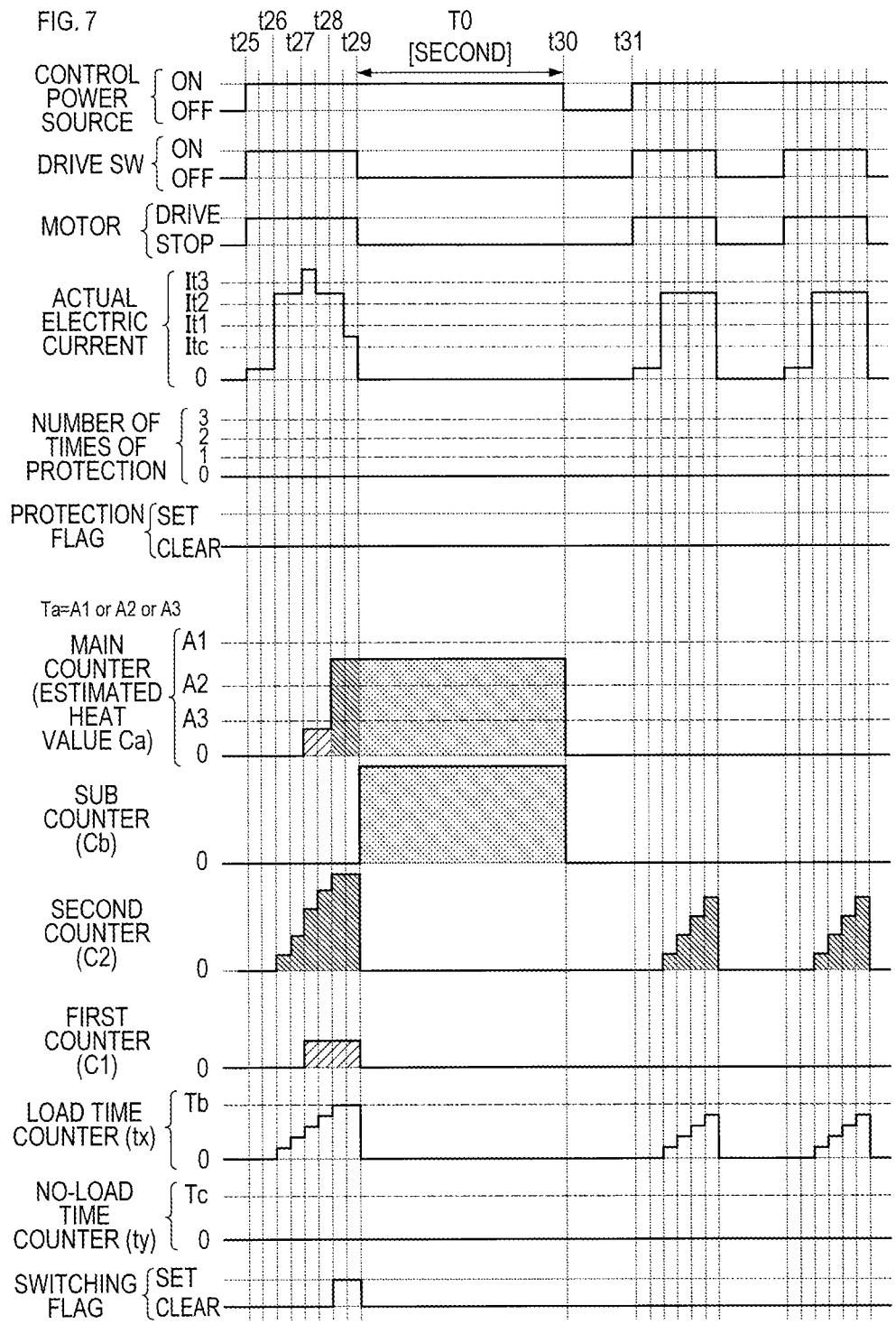
FIG. 7 is a time chart showing the rest of the specific operation example of the electric work machine.

With reference to FIGS. 5 through 7, more detailed explanation of the operation example of the overload protection function in the present embodiment will be explained. In FIGS. 5 through 7, the "control power source" means the power source circuit 22. The state of "ON" of the "control power source" corresponds to a state where the first voltage is supplied from the power source circuit 22 to the control circuit 30. The state of "OFF" of the "control power source" corresponds to a state where the first voltage is not supplied to the control circuit 30. In other words, the "control power source" can be considered as (can serve as) the power source retaining signal.

In FIGS. 5 through 7, four types of electric current thresholds are shown as the "actual electric current" in the present embodiment. These four types of electric current thresholds include a first electric current threshold It1, a second electric current threshold It2, a third electric current threshold It3, and a fourth electric current threshold Itc. The first to the fourth electric current thresholds It1, It2, It3, Itc have a relationship of "It3>It2>It1>Itc". In the examples in FIGS. 5 through 7, the state where the actual electric current value is greater than or equal to the first electric current threshold It1 corresponds to the first loaded state, and the state where the actual electric current value is less than the first electric current threshold It1 corresponds to the second loaded state. The second loaded state includes a no-load state. The no-load state corresponds to a state where the actual electric current value is less than the fourth electric current threshold Itc.

In FIGS. 5 through 7, "the number of times of protection" means the number of times a protective operation is performed. "The number of times of protection" is a count variable of the protective operation counter 58.

In FIGS. 5 through 7, the "main counter" is for calculating the estimated heat value. A count variable (or a counter value) Ca of the main counter corresponds to the estimated heat value. Hereinafter, the count variable Ca of the main counter is referred to as the "estimated heat value Ca".

Three types of heat thresholds are shown for the "main counter" in the present embodiment in FIGS. 5 through 7. These three types of the heat thresholds include a first heat threshold A1, a second heat threshold A2, and a third heat threshold A3. The first to the third heat thresholds A1, A2, A3 have a relationship of "A1>A2>A3". Each of the first to the third heat thresholds A1, A2, A3 correspond to an estimated heat value at which a protective operation should be performed. In the present embodiment, as it will be explained later, one of the first to the third heat thresholds A1, A2, A3 is used as a heat threshold Ta. In the present embodiment, the heat threshold Ta becomes less as the number of times the protective operation is performed increases.

In response to the actual electric current value becoming less than the fourth electric current threshold Itc, a "sub counter" holds the estimated heat value Ca of that moment. Hereinafter, a counter value Cb of the sub counter is referred to as an "instantaneous value Cb" (or "held value Cb"). In other words, the instantaneous value Cb corresponds to the estimated heat value Ca when the actual electric current value falls to the fourth electric current threshold Itc. The main counter and the sub counter correspond to the heat calculation circuit 57 in FIG. 16.

In FIGS. 5 through 7, "the first counter" corresponds to the first counter 56a in FIG. 16; "the second counter" corresponds to the second counter 56b in FIG. 16. Each of the first counter 56a and the second counter 56b is used to calculate the estimated heat value Ca. Hereinafter, the count variable (or the counter value) of the first counter 56a is referred to as a "first count variable C1" and the count variable (or the counter value) of the second counter 56b is referred to as a "second count variable C2".

The first count variable C1 is periodically and repeatedly increased in increments of the first increment value while the motor 10 is in the first loaded state. In other words, the first increment value is periodically and repeatedly added to the current first count variable C1 to update the first count variable C1.

The second count variable C2 is periodically and repeatedly increased in increments of the second increment value while the motor 10 is in the first loaded state. In other words, the second increment value is periodically and repeatedly added to the current second count variable C2 to update the second count variable C2.

The second increment value is greater than the first increment value. Thus, the second count variable C2 is greater than the first count variable C1.

In the present embodiment, the first count variable C1 is enabled while the load time is less than first time threshold Tb, and the estimated heat value Ca is calculated by using the first count variable C1. Meanwhile, once the load time is greater than or equal to the first time threshold Tb, the second count variable C2 is enabled, and the estimated heat value Ca is calculated by using the second count variable C2.

The first increment value and the second increment value may be fixed regardless of the actual electric current value or may vary in accordance with the actual electric current value.

In the present embodiment, the first increment value varies in accordance with the actual electric current value. More specifically, in the present embodiment, the first increment value is set to a high-level first increment value $\alpha 1$ when the actual electric current value is greater than or equal to the third electric current threshold It3. The first increment value is set to a mid-level first increment value $\beta 1$ when the actual electric current value is less than the third electric current threshold It3 and greater than or equal to the second electric current threshold It2. The first increment value is set to a low-level first increment value $\gamma 1$ when the actual electric current value is less than the second electric current threshold It2 and greater than or equal to the first electric current threshold It1.

In the present embodiment, the second increment value also varies in accordance with the actual electric current value. More specifically, in the present embodiment, a high-level second increment value $\alpha 2$ is set to the second increment value when the actual electric current value is greater than or equal to the third electric current threshold It3. The second increment value is set to a mid-level second increment value $\beta 2$ when the actual electric current value is less than the third electric current threshold It3 and greater than or equal to the second electric current threshold It2. The second increment value is set to a low-level second increment value $\gamma 2$ when the actual electric current value is less than the second electric current threshold It2 and greater than or equal to the first electric current threshold It1.

The high-level first increment value $\alpha 1$, the mid-level first increment value $\beta 1$, the low-level first increment value $\gamma 1$, the high-level second increment value $\alpha 2$, the mid-level second increment value $\beta 2$, and the low-level second increment value $\gamma 2$ are determined, for example, to satisfy the following formulas (1) through (5).

$$\alpha 1 \geq \beta 1 \geq \gamma 1 \geq 0 \qquad (1)$$

$$\alpha 1 > 0 \qquad (2)$$

$$\alpha 2 > \beta 2 > \gamma 2 > 0 \qquad (3)$$

$$\alpha 2 \geq \alpha 1, \beta 2 \geq \beta 1, \gamma 2 \geq \gamma 1 \qquad (4)$$

$$\alpha 2 > \alpha 1 \text{ and/or } \beta 2 > \beta 1 \text{ and/or } \gamma 2 > \gamma 1 \qquad (5)$$

The formula (5) means that it is required that at least one of "$\alpha 2 > \alpha 1$", "$\beta 2 > \beta 1$", or "$\gamma 2 > \gamma 1$" is satisfied.

In the operation examples shown in FIGS. 5 through 7, the high-level first increment value $\alpha 1$, the mid-level first increment value $\beta 1$, and the low-level first increment value $\gamma 1$ are determined to meet the following formulas (6) and (7).

$$\alpha 1 = \alpha 2 \qquad (6)$$

$$\beta 1 = \gamma 1 = 0 \qquad (7)$$

Accordingly, in the operation examples shown in FIGS. 5 through 7, the first count variable C1 does not actually increase in some cases although the second count variable C2 periodically increases while the motor 10 is in the first loaded state. More specifically, the mid-level first increment value $\beta 1$ or the low-level first increment value $\gamma 1$ is used when the actual electric current value is less than the third electric current threshold It3 even if the actual electric current value is greater than or equal to the first electric current threshold It1. In the present embodiment, the mid-level first increment value $\beta 1$ and the low-level first increment value $\gamma 1$ are zero. Accordingly, the first count variable C1 does not change even though the calculation to add the mid-level first increment value $\beta 1$ or the low-level first increment value $\gamma 1$ to the current first count variable C1 is performed.

In FIGS. 5 through 7, a "load time counter" is a counter that cumulatively measures the time period during which the motor 10 is in the first loaded state. In other words, the load time counter measures the time period during which the first loaded state continues, or a load time tx. The count variable of the load time counter corresponds to the load time tx. In other words, in the present embodiment, the load time tx is measured by a periodical and repeated increase (or count up) of the count variable of the load time counter while the motor 10 is in the first loaded state. The load time counter corresponds to the time counting circuit 52 in FIG. 16. If the state of the motor 10 is changed to the second loaded state during the measurement of the load time tx, the load time tx is not reset (or initialized) immediately. In the present embodiment, even if the state of the motor 10 is changed to the second loaded state, the load time tx that was being measured at the time of the change of the state of the motor 10 to the second loaded state is retained as long as the actual electric current value is greater than or equal to the fourth electric current threshold Itc. In response to the actual electric current value becoming less than the fourth electric current threshold Itc, the load time tx is reset. The reset of the load time tx may include, for example, the load time tx being set to zero or to a specified initial value. The load time tx may be reset in response to, for example, the actual electric current value becoming less than the first electric current threshold It1. In the "load time counter" in FIGS. 5 through 7, the first time threshold Tb is shown. The first time threshold Tb is used to determine which of the first count variable C1 or the second count variable C2 should be enabled.

In FIGS. 5 through 7, a "no-load time counter" is a counter for measuring a no-load time ty. More specifically, the no-load time counter initiates the measurement of the no-load time ty after the measurement of the load time tx is initiated by the load time counter in a case where the actual electric current value is less than the fourth electric current threshold Itc. In the "no-load time counter" in FIGS. 5 through 7, a second time threshold Tc is shown. The second time threshold Tc is used to determine the time when the load time counter should be cleared.

The number of times of protection, a protection flag, the main counter, the sub counter, the first counter 56a, the second counter 56b, the load time counter, the no-load time counter, and a switching flag shown in FIGS. 5 through 7 are performed, set, used, or the like by the software processing in the CPU 30a. More specifically, these are all performed, set, used, or the like by the protection determiner 36 shown in FIG. 2 and FIG. 16.

Detailed explanations of the operation examples shown in FIGS. 5 through 7 will be provided in chronological order. In FIGS. 5 through 7, each of the vertical broken lines shows a control timing. In other words, each of these broken lines is drawn for every control cycle. In the present embodiment, a main process (see FIG. 8), which will be explained later, is repeatedly performed at the control cycle. In FIGS. 5 through 7, the main process is generally performed at the control timing corresponding to each broken line.

At time t1, the trigger 9 is manually operated by the user, and the drive switch 9a is turned ON. This causes the first voltage to be supplied to the control circuit 30; the control circuit 30 is thereby activated, and the motor 10 is driven. At the time t1, for example, the motor 10 rotates but no operation is performed; and therefore, the chain blade 8 idles. Accordingly, almost no load is imposed on the motor at the time t1, and the actual electric current value is low (less than the fourth electric current threshold Itc).

At time t2, the user actually abuts the chain blade 8 against a target to cut and starts an operation. This increases the actual electric current value to greater than or equal to the second electric current threshold It2 and less than the third electric current threshold It3. Then, the first counter 56a and the second counter 56b are each counted up, and the measurement of the load time tx by the load time counter is initiated. In the present embodiment, as mentioned above, the first increment value (more specifically, the mid-level first increment value β1) is zero when the actual electric current value is greater than or equal to the second electric current threshold It2 and less than the third electric current threshold It3. In other words, the first count variable C1 is periodically and repeatedly increased in increments of zero. In this case, the first count variable C1 is actually not changed. Meanwhile, the second count variable C2 is periodically and repeatedly increased (counted up, or added) in increments of the mid-level second increment value β2.

During the time where the load time tx is less than the first time threshold Tb, the first count variable C1 is enabled. In this case, the first count variable C1 is added to the count variable of the main counter (that is, the estimated heat value Ca). More specifically, the value obtained by adding the first count variable C1 to the instantaneous value Cb of the sub counter is retained by the main counter as the estimated heat value Ca. However, at the time t2, both the first count variable C1 and the instantaneous value Cb are zero. Accordingly, at the time t2, the estimated heat value Ca remains zero.

At the control timing right after the time t2 (that is, one control timing before time t3), the actual electric current value remains the same as the time t2. Therefore, in this control timing, increase of the second count variable C2 and measurement of the load time tx is continued in the same manner as in the time t2.

At the time t3, the user temporarily stopped the cutting operation while continuing the manual operation of the trigger 9. This brings the state of the motor 10 to a state close to a no load state; and thus, the actual electric current value is decreased to less than the fourth electric current threshold Itc. In this case, the first and the second count variables C1, C2 and the load time tx remain at their current values. Moreover, based on the actual electric current value being decreased to less than the fourth electric current threshold Itc during the measurement of the load time tx, the measurement of the no-load time ty by the no-load time counter is initiated.

At time t4, the actual electric current value continues to be less than the fourth electric current threshold Itc as it is in the time t3. Thus, the measurement of the no-load time ty is continued, and the no-load time ty reaches the second time threshold Tc. The load time tx is thereby cleared. In addition, the no-load time ty, the first and the second count variables C1, C2, and the switching flag are also cleared. The current estimated heat value Ca is retained by the sub counter as the instantaneous value Cb. At this point, the instantaneous value Cb remains zero since the estimated heat value Ca is zero. In the present embodiment, to "clear" means to "initialize", for example, except for the switching flag. More specifically, to "clear" means to set the value to a specified initial value except for the switching flag. The initial value may be any values. In the present embodiment, the initial value is zero for example.

At time t5, the user resumes the cutting operation. The actual electric current value is thereby increased to a value greater than or equal to the first electric current threshold It1 and less than the second electric current threshold It2. The first and the second counters 56a, 56b are thereby each counted up, and the measurement of the load time tx is initiated. More specifically, the first count variable C1 remains unchanged in the same manner as at the time t2. Meanwhile, the second count variable C2 is periodically and repeatedly increased in increments of the low-level second increment value γ2.

In the manner as mentioned above, each counter is updated, cleared, or maintained based on the actual electric current value at every control timing that comes repeatedly in each control cycle.

At time t6, the actual electric current value decreases to a value less than the first electric current threshold It1. However, the actual electric current value is greater than or equal to the fourth electric current threshold Itc. Accordingly, the no-load time counter does not initiate the measurement.

At time t7, the actual electric current value increases to a value greater than or equal to the third electric current threshold It3. Accordingly, the high-level first increment value α1 is added to the first count variable C1, and the high-level second increment value α2 is added to the second count variable C2. At time t7, the load time tx has not yet reached the first time threshold Tb. In other words, the load time tx is still short. Accordingly, a value obtained by adding the first count variable C1 to the instantaneous value Cb is input to the main counter as the estimated heat value Ca.

At time t8, the actual electric current value decreases to a value less than the fourth electric current threshold Itc. Accordingly, in the same manner as at the time t3, the measurement of the no-load time ty is initiated.

At time t9, the no-load time ty reaches the second time threshold Tc. Accordingly, in the same manner as at time t4, the load time tx, the no-load time ty, the first and the second count variables C1, C2, and the switching flag are cleared. In addition, the current estimated heat value Ca is retained by the sub counter as the instantaneous value Cb.

At time t10, the user stops the manual operation of the trigger 9, and the trigger 9 is therefore returned to the initial position. Accordingly, the drive switch 9a is turned OFF, and the motor 10 is stopped. In response to the drive switch 9a being turned OFF, the measurement of a trigger-off-time is initiated. The trigger-off-time corresponds to a period of time during which the OFF-state of the drive switch 9a is continued since the time at which the drive switch 9a is turned to OFF-state from its ON-state. In response to the trigger-off-time reaching the power-source-OFF determination time period TO, the power source retaining signal is stopped, the supply of the first voltage to the control circuit 30 is stopped, and the operation of the control circuit 30 is stopped. If the drive switch 9a is turned ON again before the trigger-off-time reaches the power-source-OFF determination time period TO, then the trigger-off-time is cleared. At the time t10, the estimated heat value Ca of the main counter and the instantaneous value Cb of the sub counter are maintained.

At time t11, the drive switch 9a is turned ON again, and the motor 10 rotates.

At time t12, the cutting operation by the user is resumed, and the actual electric current value increases to a value greater than or equal to the first electric current threshold It1. Accordingly, in the same manner as at time t5, the first and the second count variable C1, C2 are updated in accordance with the actual electric current value, and the measurement of the load time tx is initiated.

As mentioned above, in the present embodiment, the first count variable C1 does not substantially increase while the actual electric current value is less than the third electric current threshold It3. However, if the actual electric current value increases to a value greater than or equal to the third electric current threshold It3 at time t13, the first count variable C1 also increases in the same manner as at the time t7. Also at the time t13, the load time tx has not yet reached the first time threshold Tb. Therefore, the value obtained by adding the first count variable C1 to the instantaneous value Cb is input to the main counter as the estimated heat value Ca.

At time t14, the load time tx reaches the first time threshold Tb since the first loaded state still continues. Accordingly, the switching flag is set. The second count variable C2 is enabled during the time where the switching flag is set. Thus, the value obtained by adding the second count variable C2 to the instantaneous value Cb is input to the main counter as the estimated heat value Ca. As a result, at the time t14, the estimated heat value Ca becomes greater than or equal to the first heat threshold A1. In the example shown in FIG. 5, no protective operation has been performed so far up until the time t14. Thus, at the time t14, the heat threshold Ta is set to the first heat threshold A1. Accordingly, the protection flag is set, and the number of times of protection (in other words, the count variable of the protective operation counter) is set to one at the time t14. In response to the protection flag being set, a protective operation is performed, which stops the motor 10. In other words, the motor 10 is forced to stop even though the drive switch 9a is still turned ON. Accordingly, the actual electric current value becomes zero. In addition, all counters and switching flags except for the protection flag are cleared.

In response to the motor 10 being stopped by the protective operation, the user can recognize that some protection function is activated. In this case, it is anticipated that the user turns the drive switch 9a OFF.

At time t15, the user turns the drive switch 9a OFF, and the protection flag is cleared. Thus, if the drive switch 9a is turned ON again at time t16, the motor 10 is driven in the same manner as at the time t1. When the actual electric current value increases to a value greater than or equal to the first electric current threshold It1 at time t17, the first and the second count variable C1, C2 increases in accordance with the actual electric current value, and the measurement of the load time tx is initiated in the same manner as at the time t2.

The number of times of protection is one at the time t17. In other words, one or more protective operations have already been performed. Thus, the second count variable C2 is enabled although the switching flag is cleared. In other words, in the present embodiment, the first count variable C1 is enabled when both of the following are satisfied: (i) the switching flag is cleared, and (ii) the number of times of protection is zero. Meanwhile, the second count variable C2 is enabled when the switching flag is set, or when the number of times of protection is one or more. Accordingly, at the time t17, the value obtained by adding the second count variable C2 to the instantaneous value Cb is input to the main counter as the estimated heat value Ca.

The operation example from the time the actual electric current value decreases to the value less than the fourth electric current threshold Itc at time t18 until just before time t19 is basically the same as the operation example from the time t3 to the time t7 except that the second count variable C2 is enabled.

At the time t19, the second count variable C2 increases based on the actual electric current value being increased to the value greater than or equal to the third electric current threshold It3. The estimated heat value Ca accordingly becomes greater than or equal to the second heat threshold A2. At the time t19, the number of times of protection is one. Thus, the heat threshold Ta is set to the second heat threshold A2 at the time t19. Accordingly, the protection flag is set, and the number of times of protection is increased to two at the time t19. Based on the protection flag being set, a protective operation is performed to stop the motor 10. The motor 10 is thereby forced to stop, and the actual electric current value becomes zero. In addition, all of the counters and switching flags except for the protection flag are cleared. When the drive switch 9a is turned OFF at time t20, the protection flag is cleared.

The operation example at and after time t21 will be explained with reference to FIG. 6. At the time t21, the drive switch 9a is turned ON again. The motor 10 is thereby driven in the same manner as at the time t1.

At time t22, the actual electric current value increases to the value greater than or equal to the first electric current threshold It1. Accordingly, the first and the second count variables C1, C2 are increased in accordance with the actual electric current value, and the measurement of the load time tx is initiated in the same manner as at the time t2.

At the time t22, the number of times of protection is two. Thus, the second count variable C2 is enabled although the switching flag is cleared. Accordingly, at the time t22, the value obtained by adding the second count variable C2 to the instantaneous value Cb is input to the main counter as the estimated heat value Ca.

At time t23, the second count variable C2 increases since the first loaded state is continuing. Accordingly, the estimated heat value Ca increases to a value greater than or equal to the third heat threshold A3. The heat threshold Ta at the time t23 is set to the third heat threshold A3 since the number of times of protection is two. Thus, at the time t23, the protection flag is set, and the number of times of protection is increased to three. Based on the protection flag being set, a protective operation is performed, and the motor 10 is stopped. In addition, all of the counters and the switching flags except for the protection flag are cleared.

In the present embodiment, once the number of times of protection reaches a prescribed number, the protection flag is not cleared during the operation of the control circuit 30 even if the drive switch 9a is turned OFF. Accordingly, the motor 10 is not driven even if the drive switch 9a is alternately and repeatedly turned ON and OFF.

At time t24, the drive switch 9a has been continuously tuned OFF for the power-source-OFF determination time period TO. Thus, at the time t24, the control circuit 30 stops delivering the power source retaining signal to the power source circuit 22. This stops the supply of the first voltage to the control circuit 30, which stops the operation of the control circuit 30. Accordingly, all of the counters and flags shown in FIG. 6 are cleared. Specifically, the number of times of protection and the protection flag are cleared at the time t24.

After the operation of the control circuit 30 is stopped, the drive switch 9a is turned ON again at time t25. In a like manner as provided at the time t1, the first voltage is supplied to the control circuit 30, the control circuit 30 is thereby activated, and the motor 10 is driven at the time t25.

At time t26, the actual electric current value increases to a value greater than or equal to the first electric current threshold It1. Thus, in a like manner a provided at the time t2, the first and the second count variables C1, C2 are increased in accordance with the actual electric current value, and the measurement of the load time tx is started at the time t26.

The operation example at and after time t26 will be explained with reference to FIG. 7. The first loaded state continues from the time t26. Accordingly, increase of the first and the second count variables C1, C2 and measurement of the load time tx are continued. However, as mentioned above, the first count variable C1 does not actually increase while the actual electric current value is less than the second electric current threshold It2 in the present embodiment.

At time t27, the actual electric current value increase to a value greater than or equal to the third electric current threshold It3. Thus, at the time t27, the first increment value (specifically, the high-level first increment value α1) is added to the first count variable C1. Accordingly, at the time t27, the value obtained by adding the first count variable C1 to the instantaneous value Cb is input to the main counter as the estimated heat value Ca.

At time t28, the load time tx reaches the first time threshold Tb; and thus, the switching flag is set. In other words, the second count variable C2 is enabled. Accordingly, the value obtained by adding the second count variable C2 to the instantaneous value Cb is input to the main counter as the estimated heat value Ca.

At time t29, the drive switch 9a is turned OFF by the user; and thus, the motor 10 is stopped. In addition, the estimated heat value Ca of the main counter at the time t29 is retained by the sub counter as the instantaneous value Cb.

From the time t29 to the time t30, the drive switch 9a has been continuously turned OFF for the power-source-OFF determination time period TO. Thus, in a like manner as provided at the time t24, the supply of the first voltage to the control circuit 30 is stopped and the operation of the control circuit 30 is thereby stopped at the time t30. Accordingly, all of the counters and flags shown in FIG. 6 are cleared. Specifically, the main counter and the sub counter are cleared at the time t30.

At and after the time t31, a use example in which the load time tx does not reach the first time threshold Tb is shown. Thus, the first count variable C1 is enabled at and after the time t31. Furthermore, the use example further shows that the actual electric current value does not reach or exceed the third electric current threshold It3 at and after the time t31. Accordingly, at and after the time t31, the first count variable C1 does not actually increase since the first increment value is zero even though a calculation to update the first counter 56a is performed. Thus, the estimated heat value Ca also remains zero.

2-4. Main Process 2-4-1. Outline of Main Process

Figure 8:
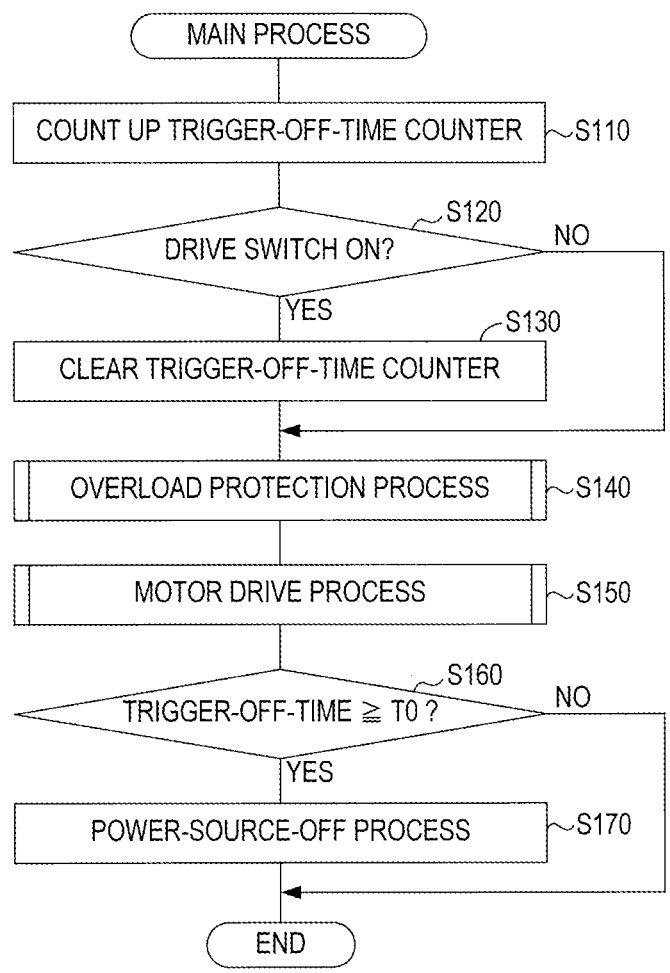
FIG. 8 is a flow chart of a main process.

The aforementioned overload protection function (particularly those in the operation examples shown in FIGS. 5 through 7) is performed by the control circuit 30 (specifically, the CPU 30a) executing the main process shown in FIG. 8. The control circuit 30 repeatedly performs the main process shown in FIG. 8 at the aforementioned control cycle in response to the activation of the control circuit 30.

Once the main process is started, the control circuit 30 counts up the trigger-off-time counter in S110. The trigger-off-time counter measures the trigger-off-time. The trigger-off-time corresponds to a time period in which the drive switch 9a is continuously tuned OFF.

In S120, the control circuit 30 determines whether the drive switch 9a is turned ON. If the drive switch 9a is turned OFF, the process proceeds to S140. If the drive switch 9a is turned ON, the control circuit 30 proceeds to S130 and clears the trigger-off-time counter. More specifically, the trigger-off-time is set to zero in the present embodiment.

In S140, the control circuit 30 performs an overload protection process. More specifically, the control circuit 30 calculates the estimated heat value Ca based on the actual electric current value. The control circuit 30 determines whether the protection process should be performed based on the estimated heat value Ca calculated. In other words, the control circuit 30 determines whether the motor 10 is in the overloaded state. If the motor 10 is in the overloaded state, the control circuit 30 sets the protection flag. Details of the overload protection process in S140 will be mentioned later with reference to FIGS. 10 through 15.

In S150, the control circuit 30 performs a motor drive process. Details of the motor drive process is as described in FIG. 9. Once the motor drive process is started, the control circuit 30 determines whether the drive switch 9a is turned ON in S210. If the drive switch 9a is turned OFF, the control circuit 30 performs the motor stop process to thereby stop the motor 10 at S250. More specifically, the control circuit 30 stops generating the PWM signal to stop the output of the control command to the drive circuit 21. After executing the motor stop process, the process proceeds to S160 (see FIG. 8).

If the drive switch 9a is turned ON in S210, the control circuit 30 determines whether the protection flag is cleared in S220. The protection flag is set in S815 shown in FIG. 15, which will be explained later, if the estimated heat value Ca increases to a value greater than or equal to the heat threshold Ta (in other words, if the motor 10 is in the overloaded state).

If the protection flag is set in S220, the control circuit 30 performs a protective operation in S240 to thereby stop the motor 10. After executing the protective operation, the process proceeds to S160 (see FIG. 8).

If the protection flag is cleared in S220, the control circuit 30 performs a drive control process in S230 to thereby drive the motor 10. More specifically, the control circuit 30 calculates the duty ratio of the PWM signal. The control circuit 30 may calculate the duty ratio such that an actual rotational speed of the motor 10 is equal to a specified target speed, for example. The target speed may be fixed, or may be changed continuously or stepwise by the user. For example, the target speed may be designated in accordance with the position (for example, the moving amount from the initial position) of the trigger 9. The control circuit 30 outputs a control command that corresponds to the duty ratio calculated to the drive circuit 21. After the execution of the drive control process in S230, the process proceeds to S160 (see FIG. 8).

As mentioned above, the aforementioned overload protection function is achieved mainly by the overload protection process in S140 and the motor drive process in S150.

In S160, the control circuit 30 determines whether the trigger-off-time is greater than or equal to the power-source-OFF determination time period TO. If the trigger-off-time is less than the power-source-OFF determination time period TO, then the control circuit 30 ends the main process. If the trigger-off-time is greater than or equal to the power-source-OFF determination time period TO, the control circuit 30 performs a power-source-OFF process in S170. More specifically, the control circuit 30 stops the output of the power source retaining signal to the power source circuit 22. Accordingly, the supply of the first voltage from the power source circuit 22 to the control circuit 30 is stopped, and the operation of the control circuit 30 stops. The time t24 in FIG. 6 shows one example of a timing that is determined when the trigger-off-time is greater than or equal to the power-source-OFF determination time period TO in S160.

2-4-2. Outline of Overload Protection Process

The outline of the overload protection process in S140 is explained next with reference to FIG. 10.

Once the overload protection process is started, the control circuit 30 determines the drive state of the motor 10 in S300. This determination includes a determination whether the motor 10 is being driven (in other words, whether the control command to rotate the motor 10 is being output). Details of S300 will be explained later with reference to FIG. 11.

The control circuit 30 sets the heat threshold Ta in S400. In other words, the control circuit 30 sets one of the aforementioned first to the third heat thresholds A1 through A3 as the heat threshold Ta. Details of S400 will be explained later with reference to FIG. 12.

The control circuit 30 calculates the actual electric current value in S500. Details of S500 will be explained later with reference to FIG. 12.

In 600, the control circuit 30 determines whether the motor 10 is in the first loaded state and performs various processes in accordance with the result of the determination. Details of S600 will be explained later with reference to FIG. 13.

In S700, the control circuit 30 updates the main counter, in other words, updates the estimated heat value Ca. Specifically, the control circuit 30 updates the first and the second count variables C1, C2 if the actual electric current value calculated in S500 is greater than or equal to the first electric current threshold It1. The control circuit 30 updates the estimated heat value Ca based on thus updated first and second count variables C1, C2, the instantaneous value Cb of the sub counter, and the load time tx. Details of S700 will be explained later with reference to FIG. 14.

Figure 9:
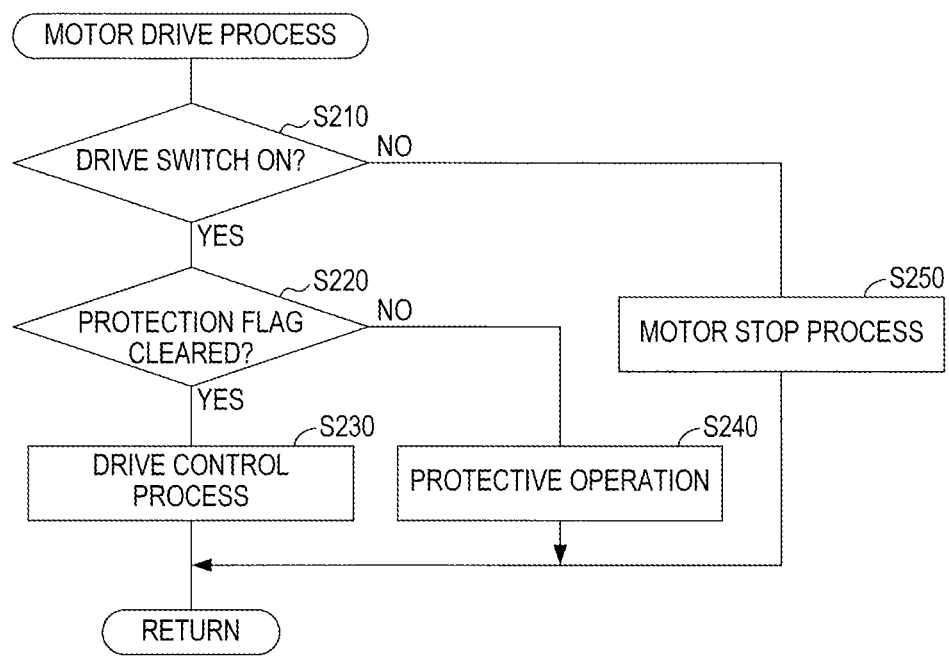
FIG. 9 is a flow chart of a motor drive process.

In S800, the control circuit 30 performs a motor protection determination. Specifically, the control circuit 30 compares the estimated heat value Ca updated in S700 with the heat threshold Ta set in S400. If the estimated heat value Ca is greater than or equal to the heat threshold Ta, the control circuit 30 determines that it is likely that the motor 10 is in the overloaded state (in other words, that the motor 10 is overheating) and sets the protection flag. Once the protection flag is set, the motor 10 is stopped by a protective operation in S240 in the next occasion when the motor drive process in S150 (detail is shown in FIG. 9) is performed again. Details of S800 will be explained later with reference to FIG. 15.

2-4-3. Details of Overload Protection Process

Figure 10:
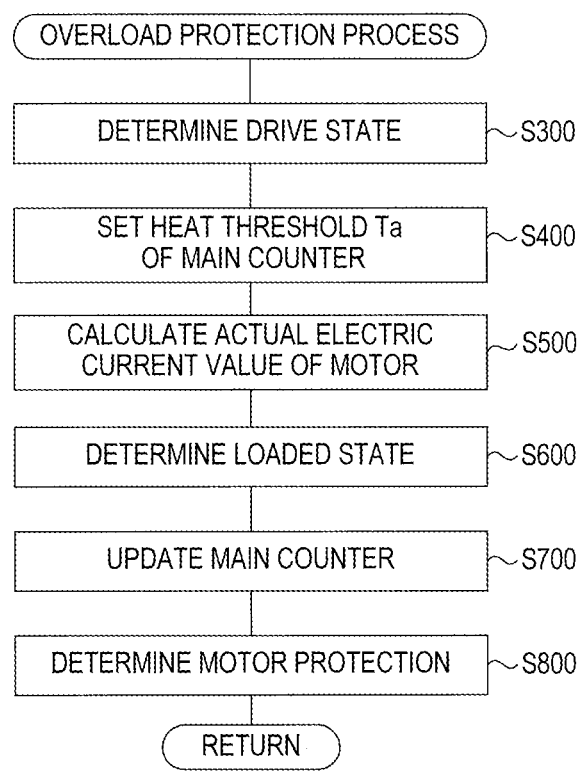
FIG. 10 is a flow chart showing an outline of an overload protection process.

Details of the overload protection process, the outline of which is shown in FIG. 10, will be explained next with reference to FIGS. 11 through 15.

Figure 11:
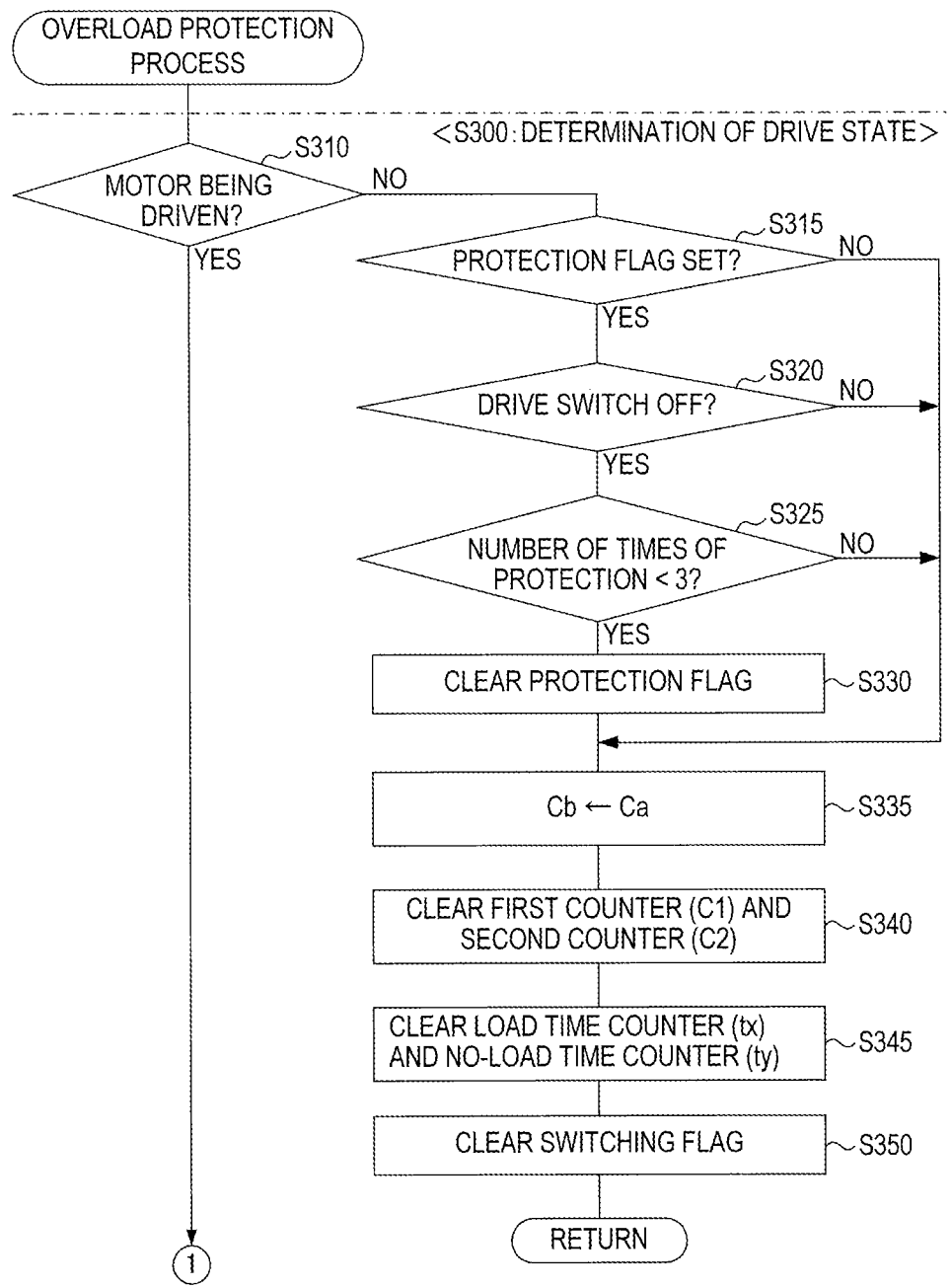
FIG. 11 is a flow chart showing a part of detail of the overload protection process.

First of all, details of the process in S300 in FIG. 10 will be explained with reference to FIG. 11. The processes of S310 to S350 shown in FIG. 11 correspond to the process of S300 in FIG. 10 that is the process of determining the drive state of the motor 10.

In S310, the control circuit 30 determines whether the motor 10 is being driven. Specifically, the control circuit 30 determines whether the control circuit 30 is outputting a control command to rotate the motor 10. If the motor 10 is being driven, in other words, if the control circuit 30 is outputting a control command to rotate the motor 10, the process proceeds to S410 (see FIG. 12). If the motor 10 is not being driven, in other words, if the control circuit 30 is not outputting a control command to rotate the motor 10, the process proceeds to S315.

In S315, the control circuit 30 determines whether the protection flag is set. If the protection flag is not set, the process proceeds to S335. If the protection flag is set, the control circuit 30 determines in S320 whether the drive switch 9a is turned OFF. If the drive switch 9a is turned ON, the process proceeds to S335. If the drive switch 9a is turned OFF, the control circuit 30 determines in S325 whether the number of times of protection is less than three. If the number of times of protection is less than three, the control circuit 30 clears the protection flag in S330. If the number of times of protection is equal to or more than three, the process proceeds to S335. In other words, the protection flag is not cleared if the number of times of protection is equal to or more than three.

In S335, the control circuit 30 inputs the current estimated heat value Ca (in other words, the current value of the main counter) into the sub counter as the instantaneous value Cb. In other words, while the motor 10 is not being driven, the main counter is not updated, and the count variable of the main counter is retained in the sub counter.

In S340, the control circuit 30 clears the first and the second counters 56a, 56b. Specifically, the control circuit 30 changes the first and the second count variables C1, C2 to zero. In S345, the control circuit 30 clears the load time counter and the no-load time counter. Specifically, the control circuit 30 changes the load time tx and the no-load time ty to zero. In S350, the control circuit 30 clears the switching flag. After S350, the process proceeds to S150 (see FIG. 8).

Figure 12:
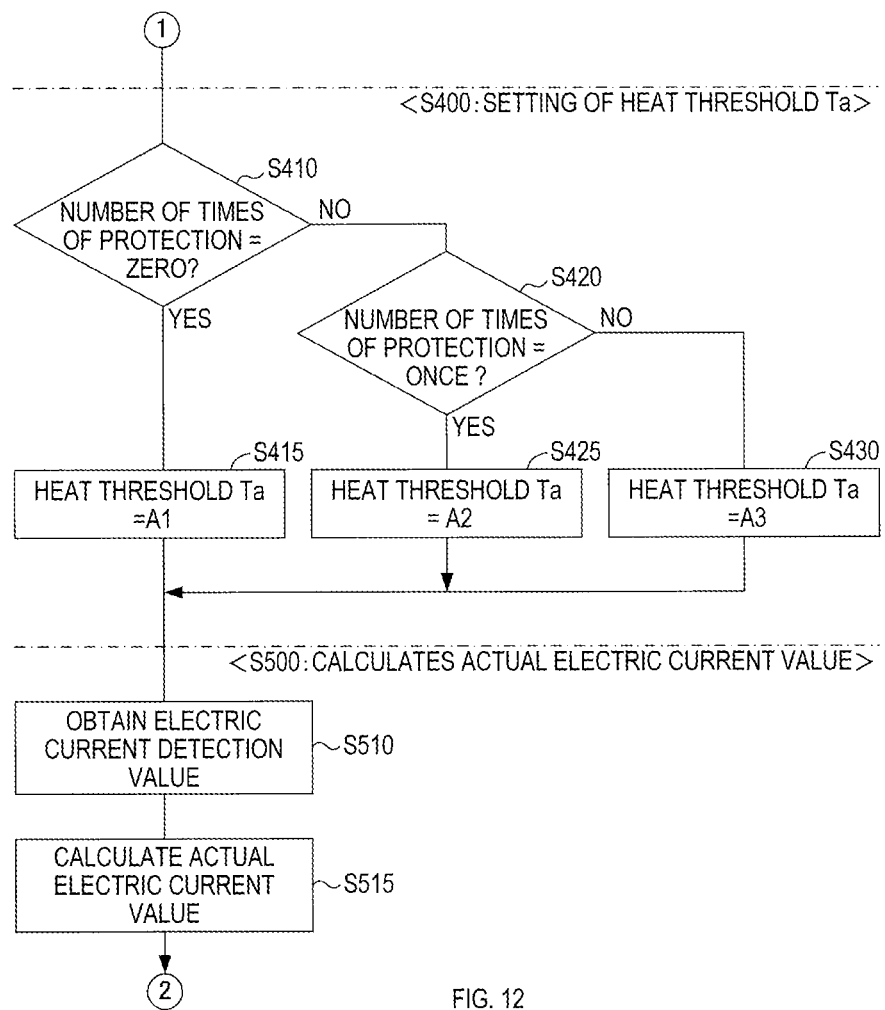
FIG. 12 is a flow chart showing another part of the detail of the overload protection process.

Details of the process of S400 in FIG. 10 will be explained next with reference to FIG. 12. The processes of S410 to S430 shown in FIG. 12 correspond to the process of S400 in FIG. 10, in other words, correspond to the process of setting the heat threshold Ta of the main counter. As mentioned above, the process proceeds to S410 if it is determined in S310 that the motor 10 is being driven.

In S410, the control circuit 30 determines whether the number of times of protection is zero. If the number of times of protection is zero, in other words, if no protective operations are performed since the activation of the control circuit 30, the control circuit 30 sets the heat threshold Ta to the first heat threshold A1 in S415. After S415, the process proceeds to S510.

If the number of times of protection is not zero in S410, in other words, if a protective operation has been performed once or more since the control circuit 30 is activated, the process proceeds to S420. In S420, the control circuit 30 determines whether the number of times of protection is one. If the number of times of protection is one, the control circuit 30 sets the heat threshold Ta to the second heat threshold A2 in S425. After S425, the process proceeds to S510.

If the number of times of protection is not one in S420, in other words, if a protective operation has already been performed twice since the activation of the control circuit 30, the process proceeds to S430. In S430, the control circuit 30 sets the heat threshold Ta to the third heat threshold A3. After S430, the process proceeds to S510.

Details of the process of S500 in FIG. 10 will be explained with reference to FIG. 12. Processes of S510 to S515 shown in FIG. 12 correspond to the process of S500 in FIG. 10, in other words, the process of calculating the actual electric current value. As mentioned above, the process proceeds to S510 after the process of S415, S425, or S430.

In S510, the control circuit 30 obtains the electric current detection value based on the electric current detection signal from the electric current detection circuit 23. In S515, the control circuit 30 calculates the actual electric current value based on the electric current detection value obtained in S510. More specifically, the control circuit 30 calculates "detection electric current value/duty ratio [%]×100" to obtain the actual electric current value.

The reason why the actual electric current value is calculated by such a calculation is explained in detail in Patent Document 1. Thus, an outline of the reason will be explained next in the present disclosure. Specifically, the electric current detection circuit 23 in the present embodiment includes the aforementioned resistor, an amplifier (not illustrated), and a low-pass filter (not illustrated). The amplifier amplifies the voltage between both ends of the resistor. The low-pass filter smooths the voltage amplified by the amplifier. The voltage smoothed by the low-pass filter is output as the electric current detection signal. Electric current flows through the resistor basically during the time corresponding to an ON-period of the PWM signal; and accordingly, no electric current flow through the resistor during the time corresponding to an OFF-period of the PWM signal. However, electric current may flow through the motor 10 also during the OFF-period of the PWM signal. Specifically, the aforementioned circulating current may flow though the motor 10 during the OFF-period of the PWM signal. The motor 10 may also generate heat by passing the circulating current. However, the circulating current cannot be detected by the electric current detection circuit 23. It means that the electric current detection signal does not necessarily show the electric current actually flowing through the motor 10 precisely. Therefore, the control circuit 30 in the present embodiment calculates the actual electric current value using the aforementioned arithmetic expression. The actual electric current value calculated by using the aforementioned arithmetic expression gives less margin of error from the value of electric current actually flowing through the motor 10.

Figure 13:
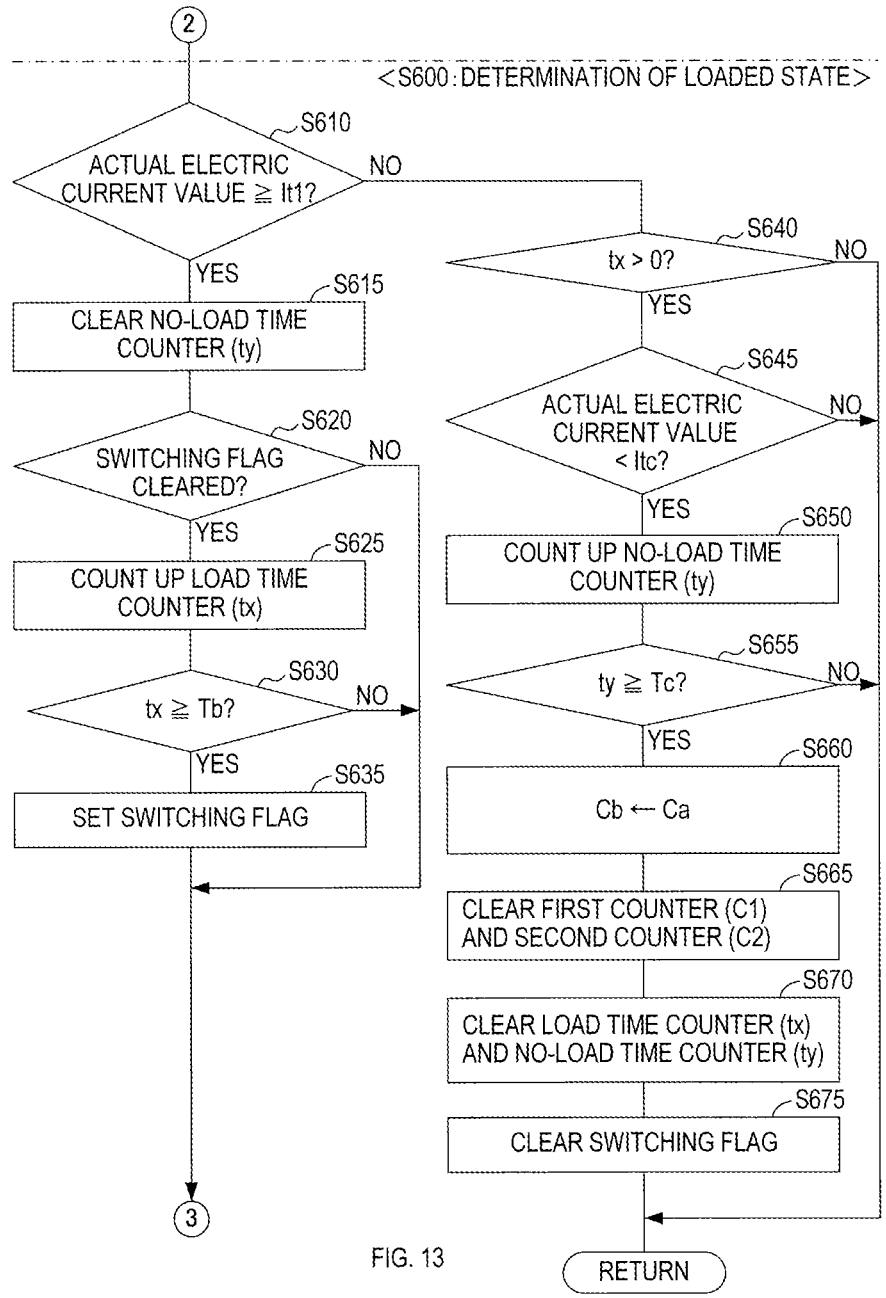
FIG. 13 is a flow chart showing yet another part of the detail of the overload protection process.

After calculating the actual electric current value in S515, the process proceeds to S610 (see FIG. 13).

Details of the process of S600 in FIG. 10 will be explained next with reference to FIG. 13. The processes of S610 to S670 shown in FIG. 13 correspond to the process of S600 in FIG. 10, in other words, correspond to the process of determining whether the motor 10 is in the first loaded state. As mentioned above, the process proceeds to S610 after S515.

In S610, the control circuit 30 determines whether the actual electric current value calculated in S515 is greater than or equal to the first electric current threshold It1. In other words, the control circuit 30 determines whether the motor 10 is in the first loaded state. If the actual electric current value is greater than or equal to the first electric current threshold It1 (in other words, the motor 10 is in the first loaded state), the control circuit 30 clears the no-load time counter in S615. In other words, the control circuit 30 changes the no-load time ty to zero.

In S620, the control circuit 30 determines whether the switching flag is cleared. If the switching flag is cleared, the control circuit 30 counts up (or adds or increases) the load time counter in S625. In other words, the count variable of the load time counter is increased by a value corresponding to the control cycle. The load time tx is thereby measured.

In S630, the control circuit 30 determines whether the load time tx is greater than or equal to the first time threshold Tb. If the load time tx is greater than or equal to the first time threshold Tb, the control circuit 30 sets the switching flag in S635. In other words, the control circuit 30 sets the switching flag to enable the second count variable C2 since the duration of the first loaded state is long. After S635, the process proceeds to S710 (see FIG. 14). If the load time tx is less than the first time threshold Tb in S630, the process proceeds to S710 without the switching flag being set. The process also proceeds to S710 if the switching flag is already set in S620.

If the actual electric current value is less than the first electric current threshold It1 (in other words, the motor 10 is in the second loaded state) in S610, the process proceeds to S640. In S640, the control circuit 30 determines whether the load time tx is greater than zero; in other words, if the load time tx is being measured. If the load time tx is zero, in other words, if the load time tx is not being measured, the control circuit 30 ends the overload protection process, and the process proceeds to S150 (see FIG. 8).

If the load time tx is greater than zero in S640, in other words, if the load time tx is being measured, the process proceeds to S645. In S645, the control circuit 30 determines whether the actual electric current value calculated in S515 is less than the fourth electric current threshold Itc. If the actual electric current value is greater than or equal to the fourth electric current threshold Itc, the control circuit 30 ends the overload protection process. If the actual electric current value is less than the fourth electric current threshold Itc, the control circuit 30 counts up the no-load time counter in S650. In other words, the control circuit 30 measures the no-load time ty by adding a value corresponding to the control cycle to the count variable of the no-load time counter.

In S655, the control circuit 30 determines whether the no-load time ty currently being measured is greater than or equal to the second time threshold Tc. If the no-load time ty has not yet reached the second time threshold Tc, the control circuit 30 ends the overload protection process. If the no-load time ty is greater than or equal to the second time threshold Tc, the process proceeds to S660. In a like manner as provided in S335, the control circuit 30 inputs the current estimated heat value Ca (that is, the current value of the main counter) into the sub counter as the instantaneous value Cb in S660. In other words, if the no-load time ty reaches the second time threshold Tc, the value of the main counter is retained by the sub counter.

In a like manner as provided in S340, the control circuit 30 clears the first and the second counters 56a, 56b in S665. In a like manner as provided in S345, the control circuit 30 clears the load time counter and the no-load time counter in S670. In S675, the control circuit 30 clears the switching flag. The process proceeds to S150 (see FIG. 8) after S675.

Figure 14:
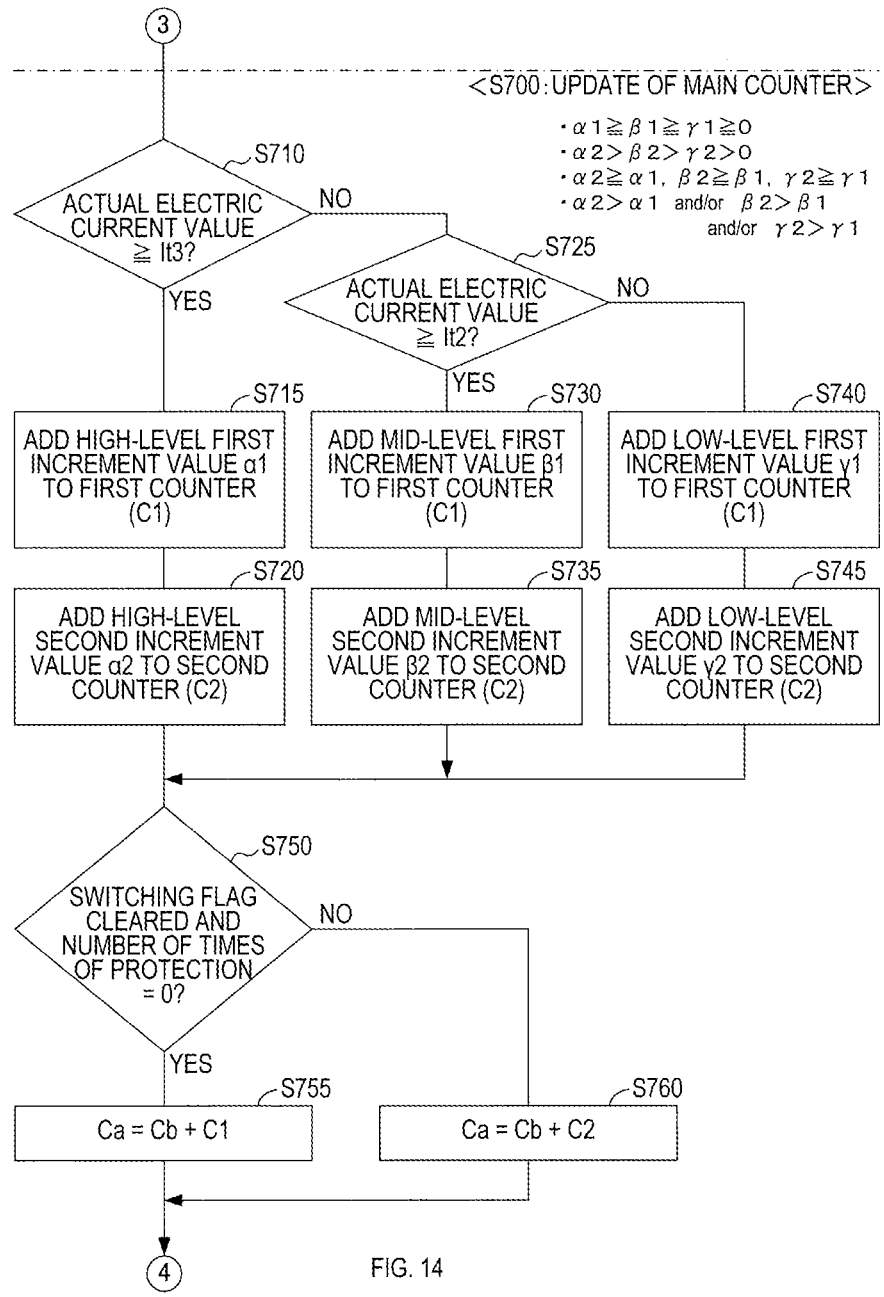
FIG. 14 is a flow chart showing yet another part of the detail of the overload protection process.

Details of the process in S700 shown in FIG. 10 will be explained next with reference to FIG. 14. Processes in S710 to S760 shown in FIG. 14 correspond to the process in S700 in FIG. 10, namely, the process of updating the estimated heat value Ca of the main counter. As mentioned above, the process proceeds to S710 if it is determined that the switching flag is set in S620 or after S635.

In S710, the control circuit 30 determines whether the actual electric current value is greater than or equal to the third electric current threshold It3. If the actual electric current value is greater than or equal to the third electric current threshold It3, the process proceeds to S715. In S715, the control circuit 30 counts up the first counter 56a. In other words, the control circuit 30 adds the high-level first increment value α1 to the current first count variable C1 of the first counter 56a to thereby update the first count variable C1. The control circuit 30 also counts up the second counter 56b in S720. In other words, the control circuit 30 adds the high-level second increment value α2 to the current second count variable C2 of the second counter 56b to thereby update the second count variable C2. The high-level first increment value α1 and the high-level second increment value α2 may correspond to, for example, the heat generation amount of the motor 10 that is predicted when electric current greater than or equal to the third electric current threshold It3 flows through the motor 10 during the control cycle. After S720, the process proceeds to S750.

If the actual electric current value is less than the third electric current threshold It3 in S710, the process proceeds to S725. In S725, the control circuit 30 determines whether the actual electric current value is greater than or equal to the second electric current threshold It2. If the actual electric current value is greater than or equal to the second electric current threshold It2, the process proceeds to S730. In S730, the control circuit 30 counts up the first counter 56a. In other words, the control circuit 30 adds the mid-level first increment value β1 to the current first count variable C1 of the first counter 56a to thereby update the first count variable C1 The control circuit 30 also counts up the second counter 56b in S735. In other words, the control circuit 30 adds the mid-level second increment value β2 to the current second count variable C2 of the second counter 56b to thereby update the second count variable C2. The mid-level first increment value β1 and the mid-level second increment value β2 may correspond to, for example, the heat generation amount of the motor 10 that is predicted when electric current greater than or equal to the second electric current threshold It2 and less than the third electric current threshold It3 flows through the motor 10 during the control cycle. After S735, the process proceeds to S750.

If the actual electric current value is less than the second electric current threshold It2 in S725, the process proceeds to S740. In S740, the control circuit 30 counts up the first counter 56a. In other words, the control circuit 30 adds the low-level first increment value γ1 to the current first count variable C1 of the first counter 56a to thereby update the first count variable C1. The control circuit 30 also counts up the second counter 56b in S745. In otherwords, the control circuit 30 adds the low-level second increment value γ2 to the current second count variable C2 of the second counter 56b to thereby update the second count variable C2 The low-level first increment value γ1 and the low-level second increment value γ2 may correspond to, for example, the heat generation amount of the motor 10 that is predicted when electric current greater than or equal to the first electric current threshold It1 and less than the second electric current threshold It2 flows though the motor 10 during the control cycle. After S745, the process proceeds to S750.

In S750, the control circuit 30 determines whether the switching flag is cleared and the number of times of protection is zero. If the switching flag is cleared and the number of times of protection is zero, the process proceeds to S755. In S755, the control circuit 30 updates the main counter. In other words, the control circuit 30 calculates the estimated heat value Ca by adding the first count variable C1 to the current instantaneous value Cb. The control circuit 30 inputs the estimated heat value Ca calculated into the main counter as the count variable of the main counter. In other words, in this case, the first count variable C1 is enabled, and the estimated heat value Ca is calculated based on the first count variable C1. After S755, the process proceeds to S810 (see FIG. 15).

The process proceeds to S760 if the switching flag is set or the number of times of protection is one or more in S750. In S760, the control circuit 30 updates the main counter. Specifically, in S760, the estimated heat value Ca is calculated by adding the second count variable C2 to the instantaneous value Cb. The control circuit 30 inputs the estimated heat value Ca calculated into the main counter as the count variable of the main counter. In other words, in this case, the second count variable C2 is enabled, and the estimated heat value Ca is calculated based on the second count variable C2. After S760, the process proceeds to S810 (see FIG. 15).

Figure 15:
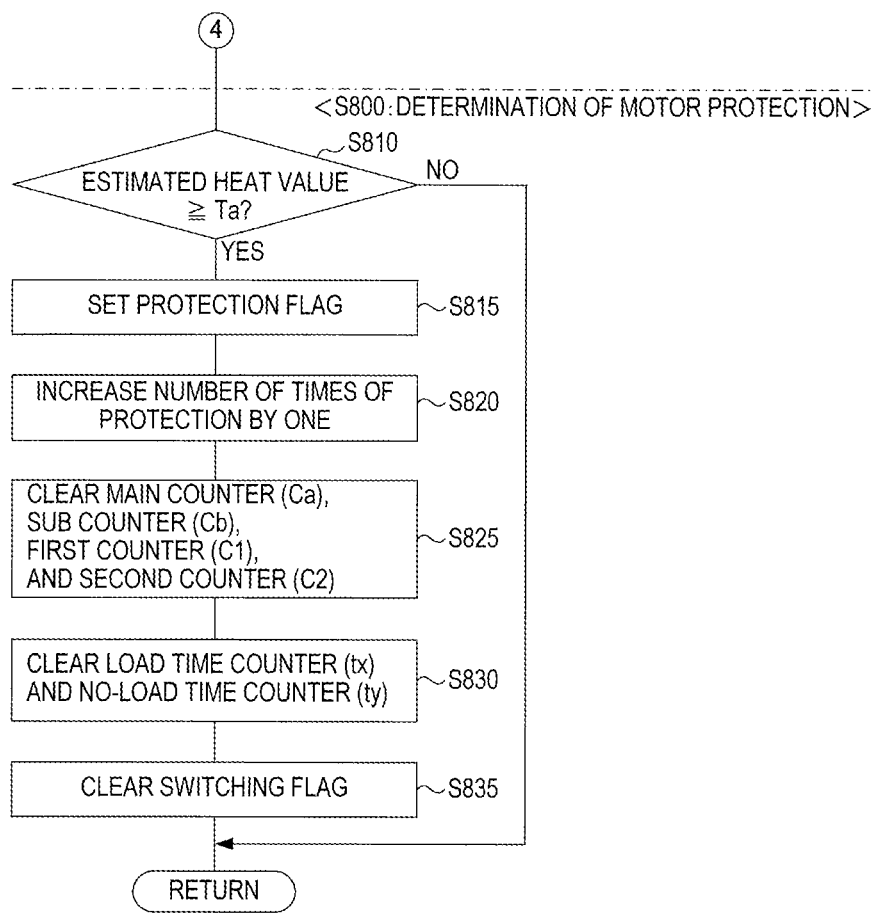
FIG. 15 is a flow chart showing the rest of the detail of the overload protection process.

Details of the process in S800 shown in FIG. 10 will be explained next with reference to FIG. 15. The processes of S810 to S835 shown in FIG. 15 correspond to the process in S800 in FIG. 10, namely, the process to perform the motor protection determination. As mentioned above, the process proceeds to S810 after S755 or S760.

In S810, the control circuit 30 determines whether the estimated heat value Ca is greater than or equal to the heat threshold Ta. The estimated heat value Ca used in S810 is the most recent estimated heat value Ca of the current moment, that is, the current count variable of the main counter, which is calculated in S755 or S760, the process right before S810. The heat threshold Ta used in S810 is a value set in S415, S425, or S430 performed right before S810.

If the estimated heat value Ca is less than the heat threshold Ta, the control circuit 30 determines that a protective operation is not necessary yet, ends the overload protection process, and proceeds to S150.

If the estimated heat value Ca is greater than or equal to the heat threshold Ta, a protective operation is necessary. In this case, the control circuit 30 sets the protection flag in S815. In S820, the control circuit 30 increases (or adds) the number of times of protection by one. In other words, the control circuit 30 increases the count variable of the protective operation counter 58 by one. In S825, the control circuit 30 clears the main counter, the sub counter, the first counter 56a, and the second counter 56b. In other words, the control circuit 30 changes the count variable of each of these counters to zero. The control circuit 30 likewise clears the load time counter and the no-load time counter in S830. In S835, the control circuit 30 clears the switching flag. After S835, the control circuit 30 ends the overload protection process, and the process proceeds to S150.

2-5. Terminology Correspondence

The trigger 9 corresponds to one example of the manual switch mentioned in the Overview of Embodiments. The protection determiner 36 corresponds to one example of the electric current calculation circuit, the time counting circuit, the heat estimation circuit, the protection circuit, the counter, the first counter, the second counter, the third counter, and the heat calculation circuit mentioned in the Overview of Embodiments. The working tool 6 corresponds to one example of the driven tool mentioned in the Overview of Embodiments. The protective operation counter 58 corresponds to one example of the third counter mentioned in the Overview of Embodiments.

Each of the first increment value X1, the second increment value X2, the high-level first increment value $\alpha 1$, the mid-level first increment value $\beta$. 1, the low-level first increment value $\gamma 1$, the high-level second increment value $\alpha 2$, the mid-level second increment value $\beta 2$, and the low-level second increment value $\gamma 2$ corresponds to one example of the parameter mentioned in the Overview of Embodiments as well as to one example of the rate of increase mentioned in the Overview of Embodiments. Particularly, each of the high-level first increment value $\alpha 1$, the mid-level first increment value $\beta 1$, and the low-level first increment value $\gamma 1$ corresponds to one example of the first increment value mentioned in the Overview of Embodiments; and each of the high-level second increment value $\alpha 2$, the mid-level second increment value $\beta 2$, and the low-level second increment value $\gamma 2$ corresponds to one example of the second increment value mentioned in the Overview of Embodiments.

The first electric current threshold It1 corresponds to one example of the electric current threshold mentioned in the Overview of Embodiments. The fourth electric current threshold Itc corresponds to one example of the specified electric current value mentioned in the Overview of Embodiments. Each of the heat threshold A0 and the first to the third heat thresholds A1 to A3 corresponds to one example of the heat threshold mentioned in the Overview of Embodiments. The first time threshold Tb corresponds to one example of the time threshold mentioned in the Overview of Embodiments. Three times of the number of times of protection, at and from which the protection flag is not cleared, corresponds to one example of the prescribed number mentioned in the Overview of Embodiments.

The processes in S240, S320 to S330, S410 to S430, and S810 to S815 correspond to one example of the processes of the protection circuit mentioned in the Overview of Embodiments and are performed by the protection circuit 54 in FIG. 16. The processes in S510 to S515 correspond to one example of the processes of the electric current calculation circuit mentioned in the Overview of Embodiments and are performed by the electric current calculation circuit 51 in FIG. 16. The process in S625 corresponds to one example of the processes of the time counting circuit mentioned in the Overview of Embodiments and are performed by the time counting circuit 52 in FIG. 16. The processes in S630 to S635, S660 to S665, and S750 to S760 correspond to one example of the processes of the heat estimation circuit, the counter, and the heat calculation circuit mentioned in the Overview of Embodiments. The processes of S750 to S760 are performed by the heat calculation circuit 57 in FIG. 16. The processes in S715, S730, and S740 correspond to one example of the processes of the first counter mentioned in the Overview of Embodiments and are performed by the first counter 56a in FIG. 16. The processes of S720, S735, and S745 correspond to one example of the processes of the second counter mentioned in the Overview of Embodiments and are performed by the second counter 56b in FIG. 16.

2-6. Other Embodiments 2-6-1. In the aforementioned embodiments, the mid-level first increment value $\beta 1$ and the low-level first increment value $\gamma 1$ are zero. Nevertheless, the mid-level first increment value $\beta 1$ and/or the low-level first increment value $\gamma 1$ may be greater than zero. The high-level first increment value $\alpha 1$, the mid-level first increment value $\beta 1$, the low-level first increment value $\gamma 1$, the high-level second increment value $\alpha 2$, the mid-level second increment value $\beta 2$, and the low-level second increment value $\gamma 2$ may be any value that satisfies the aforementioned formulas (1) to (5).

2-6-2. In the aforementioned embodiment, the increment value for the first counter changes in accordance with the magnitude (or level) of the actual electric current value. Nevertheless, the increment value for the first counter may be fixed regardless of the magnitude of the actual electric current value. In the aforementioned embodiment, the increment value for the first counter is determined to be one of three increment values in accordance with the magnitude of the actual electric current value. Nevertheless, the increment value for the first counter may be determined to be either one of two increment values, or one of four or more increment values, for example. The same applies to the increment value for the second counter.

2-6-3. In the aforementioned embodiment, the heat threshold Ta changes in accordance with the number of times of protection. Nevertheless, the heat threshold Ta may be fixed. In the aforementioned embodiment, the heat threshold Ta decreases in stages in accordance with the increase in the number of times of protection. Nevertheless, the heat threshold Ta may decrease in any manner in accordance with the increase in the number of times of protection.

2-6-4. In the aforementioned embodiment, the protection flag is not cleared if the number of times of protection reaches three. Nevertheless, the protection flag does not have to be cleared when the number of times of protection reaches two. Alternatively, the protection flag may be cleared until the number of times of protection reaches a specified times which is four times or more.

2-6-5. Two or more functions achieved by one element in the aforementioned embodiments may be achieved by two or more elements, and one function achieved by one element may be achieved by two or more elements. In addition, two or more functions achieved by two or more elements may be achieved by one element, and one function achieved by two or more elements may be achieved by one element. A part of the configurations in the aforementioned embodiments may be omitted. Furthermore, at least a part of the configurations of the aforementioned embodiments may be added to or replaced with another part of the configurations of the aforementioned embodiments.

What is claimed is:

1. An electric work machine comprising:
a holder (i) holding a driven tool in an undetachable manner or (ii) configured to hold the driven tool in a detachable manner;
a manual switch configured to be manually operated by a user of the electric work machine;
a motor configured to drive the driven tool;
a drive circuit configured to drive the motor based on the manual switch having been or being manually operated;
a time counting circuit configured to measure a load time, the load time corresponding to a time period during which a first load is continuously imposed on the motor, and the first load having a specified magnitude or more;
a heat estimation circuit configured to calculate an estimated heat value, the estimated heat value corresponding to an estimated heat generation amount of the motor, the heat estimation circuit being configured to (i) increase the estimated heat value in accordance with a rate of increase (ii) vary the rate of increase based on the load time; and
a protection circuit configured to perform a protective operation for over temperature protection of the motor based on the estimated heat value having reached a heat threshold.

2. The electric work machine according to claim 1, further comprising an electric current calculation circuit configured to calculate an electric current value, the electric current value (i) corresponding to a magnitude of an electric current delivered from a power source to the motor and (ii) reaching an electric current threshold based on the first load being imposed on the motor,
wherein the time counting circuit is configured to measure the load time based on the electric current value.

3. The electric work machine according to claim 1, wherein the protection circuit is configured to decelerate or stop the motor in the protective operation.

4. The electric work machine according to claim 1, wherein the heat estimation circuit is configured to raise the rate of increase based on the load time.

5. The electric work machine according to claim 4, wherein the heat estimation circuit is configured to raise the rate of increase based on the load time having reached a time threshold.

6. An electric work machine comprising:
a holder (i) holding a driven tool in an undetachable manner or (ii) configured to hold the driven tool in a detachable manner;
a manual switch configured to be manually operated by a user of the electric work machine;
a motor configured to drive the driven tool;
a drive circuit configured to drive the motor based on the manual switch having been or being manually operated;
an electric current calculation circuit configured to calculate an electric current value, the electric current value (i) corresponding to a magnitude of an electric current delivered from a power source to the motor and (ii) reaching an electric current threshold based on a first load being imposed on the motor, the first load having a specified magnitude or more;
a time counting circuit configured to measure a load time based on the electric current value, the load time corresponding to a time period during which the first load is continuously imposed on the motor;
a heat estimation circuit configured to calculate an estimated heat value based on the electric current value and a parameter, the estimated heat value corresponding to an estimated heat generation amount of the motor,
the parameter including a rate of increase of the estimated heat value,
the heat estimation circuit being configured to (i) while the electric current value is greater than or equal to the electric current threshold, increase the estimated heat value in accordance with the rate of increase and (ii) vary the parameter based on the load time; and
a protection circuit configured to perform a protective operation for over temperature protection of the motor based on the estimated heat value having reached a heat threshold.

7. The electric work machine according to claim 6, wherein the heat estimation circuit is configured to raise the rate of increase based on the load time having reached a time threshold.

8. The electric work machine according to claim 6, wherein the heat estimation circuit includes:
a counter configured to periodically and repeatedly increase a count variable by an increment value while the electric current value is greater than or equal to the electric current threshold, the increment value being equivalent to the rate of increase, and the counter being configured to vary the increment value based on the load time; and
a heat calculation circuit configured to calculate the estimated heat value based on the count variable.

9. The electric work machine according to claim 8, wherein the counter is configured to set the increment value either to a first value or to a second value based on the load time; and
wherein the second value is greater than the first value.

10. The electric work machine according to claim 9, wherein the counter is configured to:
set the increment value to the first value while the load time is less than a time threshold; and
set the increment value to the second value based on the load time having reached the time threshold.

11. The electric work machine according to claim 6,
wherein the heat estimation circuit includes:
- a first counter configured to periodically and repeatedly increase a first count variable by a first increment value while the electric current value is greater than or equal to the electric current threshold, and the first increment value being equivalent to the rate of increase;
- a second counter configured to periodically and repeatedly increase a second count variable by a second increment value while the electric current value is greater than or equal to the electric current threshold, the second increment value (i) being equivalent to the rate of increase and (ii) being greater than the first increment value; and
- a heat calculation circuit configured to (i) enable either the first count variable or the second count variable based on the load time and (ii) calculate the estimated heat value based on either the first count variable enabled or the second count variable enabled.

12. The electric work machine according to claim 11,
wherein the heat calculation circuit is configured to:
enable the first count variable while the load time is less than a time threshold; and
enable the second count variable based on the load time having reached the time threshold.

13. The electric work machine according to claim 11,
wherein the first count variable enabled or the second count variable enabled is equivalent to or approximate to the estimated heat value.

14. The electric work machine according to claim 13,
wherein the heat estimation circuit is configured to, when the electric current value falls to a specified electric current value, (i) hold an instantaneous value and (ii) set the first count variable, the second count variable, and the load time to their respective initial values, the specified electric current value being equal to or less than the electric current threshold, the instantaneous value corresponding to the estimated heat value calculated when the electric current value falls to the specified electric current value; and
wherein the heat calculation circuit is configured to add either the first count variable enabled or the second count variable enabled to the instantaneous value to thereby calculate the estimated heat value.

15. The electric work machine according to claim 14,
wherein the specified electric current value is less than the electric current threshold.

16. An electric work machine comprising:
- a holder (i) holding a driven tool in an undetachable manner or (ii) configured to hold the driven tool in a detachable manner;
- a manual switch configured to (i) be manually operated by a user of the electric work machine and (ii) be manually moved from its initial position by the user;
- a motor configured to drive the driven tool;
- a drive circuit configured to drive the motor based on the manual switch being moved or having been moved from its initial position;
- an electric current calculation circuit configured to calculate an electric current value, the electric current value corresponding to a magnitude of an electric current delivered from a power source to the motor;
- a time counting circuit configured to measure a load time, the load time corresponding to a time period during which a first load is continuously imposed on the motor, the first load having a specified magnitude or more;
- a heat estimation circuit configured to calculate an estimated heat value, the estimated heat value corresponding to an estimated heat generation amount of the motor, the heat estimation circuit being configured to calculate the estimated heat value based on (i) the electric current value and (ii) a parameter, the heat estimation circuit being configured to vary the parameter based on the load time; and
- a protection circuit is configured to (i) perform a protective operation for over temperature protection of the motor based on the estimated heat value having reached a heat threshold and (ii) stop the protective operation in response to the manual switch being placed at its initial position.

17. The electric work machine according to claim 16,
wherein the protection circuit is configured to perform the protective operation each time the estimated heat value reaches the heat threshold;
wherein the protection circuit is configured to vary the heat threshold based on the protection circuit having performed a first Nth protective operation; and
the first Nth protective operation corresponds to the protective operation performed firstly or thereafter.

18. The electric work machine according to claim 17,
wherein the protection circuit is configured to lower the heat threshold based on the protection circuit having performed the first Nth protective operation.

19. A method of protecting a motor of an electric work machine from over temperature, the method comprising:
- increasing an estimated heat value in accordance with a rate of increase, the estimated heat value corresponding to an estimated heat generation amount of the motor;
- varying the rate of increase based on a load time, the load time corresponding to a time period during which a first load is continuously imposed on the motor, and the first load having a specified magnitude or more; and
- performing a protective operation for over temperature protection of the motor based on the estimated heat value having reached a heat threshold.

20. An electric work machine comprising:
- a motor configured to drive a driven tool;
- a drive circuit configured to deliver an electric current from a power source to the motor to thereby drive the motor;
- a manual switch configured to receive a first operation or a second operation from a user of the electric work machine, the first operation corresponding to manually operating the manual switch continuously for a time period shorter than a time threshold, the second operation corresponding to manually operating the manual switch continuously for a time period longer than the time threshold; and
- a control circuit configured to:
  deliver a load current from the power source to the motor via the drive circuit while the first operation is being received by the manual switch and while the second operation is being received by the manual switch, the load current corresponding to the electric current having a magnitude greater than or equal to an electric current threshold,
  perform a protective operation for over temperature protection of the motor based on (i) the first operation being repeatedly received intermittently by the manual switch and (ii) a total time period during which the first operation has been received having reached a first time period, and perform the protective operation based on the second operation having been received continuously by the manual switch for a second time period or longer, the second time period being longer than the time threshold and shorter than the first time period.

\* \* \* \* \*